(12) United States Patent
Billi-Duran et al.

(10) Patent No.: US 10,545,492 B2
(45) Date of Patent: Jan. 28, 2020

(54) SELECTIVE ONLINE AND OFFLINE ACCESS TO SEARCHABLE INDUSTRIAL AUTOMATION DATA

(71) Applicant: Rockwell Automation Technologies, Inc., Mayfield Heights, OH (US)

(72) Inventors: Sharon M. Billi-Duran, Euclid, OH (US); Christopher W. Como, Chagrin Falls, OH (US); Edward A. Gray, Olmsted Township, OH (US); Kyle K. Reissner, Hudson, OH (US); Jonathan D. Walter, Broadview Heights, OH (US); Mohit Singhai, Lyndhurst, OH (US); Douglas J. Reichard, Fairview Park, OH (US); Scott N. Sandler, Chagrin Falls, OH (US); Ronald E. Bliss, Twinsburg, OH (US); Michael J. Pantaleano, Willoughby, OH (US); Ryan Cahalane, Chagrin Falls, OH (US); Jessica Korpela, Milwaukee, WI (US); Bruce T. McCleave, Jr., Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 182 days.

(21) Appl. No.: 15/391,260

(22) Filed: Dec. 27, 2016

(65) Prior Publication Data

US 2018/0088566 A1 Mar. 29, 2018

Related U.S. Application Data

(60) Provisional application No. 62/399,992, filed on Sep. 26, 2016.

(51) Int. Cl.
G06F 7/00 (2006.01)
G06F 17/30 (2006.01)
G05B 19/418 (2006.01)

(52) U.S. Cl.
CPC .............................. *G05B 19/41885* (2013.01)

(58) Field of Classification Search
CPC .... G05B 19/41885; G05B 2219/42155; G05B 2219/31334; Y02P 90/26; Y02P 90/185; Y02P 90/10; Y02P 90/86; Y02P 90/16
See application file for complete search history.

(56) References Cited

U.S. PATENT DOCUMENTS

| 5,168,441 A | 12/1992 | Onarheim et al. |
| 5,471,214 A | 11/1995 | Faibish et al. |

(Continued)

FOREIGN PATENT DOCUMENTS

| CN | 103543700 B | 8/2016 |
| EP | 1 814 045 A2 | 8/2007 |

(Continued)

OTHER PUBLICATIONS

Office Action for U.S. Appl. No. 15/241,354 dated Jan. 24, 2018, 95 pages.

(Continued)

*Primary Examiner* — Tarek Chbouki
*Assistant Examiner* — Maher N Algibhah
(74) *Attorney, Agent, or Firm* — Amin, Turocy & Watson, LLP

(57) ABSTRACT

An industrial data indexing system facilitates discovery and indexing of plant-wide data residing on multiple different data platforms. The indexing system automatically inventories industrial devices and other data sources located throughout a plant, and identifies available data items on each data source. The indexing system indexes the discov- (Continued)

ered data items in a federated data model that can subsequently be searched to locate data items or tags of interest. The federated data model records references to data items found on different types of data sources, including but not limited to industrial controller programs, human-machine interface applications, data historians, device documentation stores, inventory tracking systems, and other such data sources. The search system also caches selected portions of the data model to a user's personal device to allow these portion of the model to be accessed locally on the user's device without being online with the higher level indexing system.

20 Claims, 26 Drawing Sheets

(56) References Cited

U.S. PATENT DOCUMENTS

| | | | |
|---|---|---|---|
| 5,777,874 | A | 7/1998 | Flood et al. |
| 6,002,406 | A | 12/1999 | Zhao |
| 6,334,124 | B1* | 12/2001 | Bouchard .............. G06Q 10/06 |
| 6,583,794 | B1 | 6/2003 | Wattenberg |
| 6,788,315 | B1 | 9/2004 | Kekic et al. |
| 7,612,661 | B1 | 11/2009 | Johnson et al. |
| 8,285,744 | B2* | 10/2012 | Dorgelo ............ G06F 17/30321 |
| | | | 707/769 |
| 8,453,091 | B1 | 5/2013 | Rao et al. |
| 8,489,641 | B1 | 7/2013 | Seefeld et al. |
| 8,773,465 | B2 | 7/2014 | France et al. |
| 8,819,149 | B2 | 8/2014 | Amidon et al. |
| 8,886,153 | B2 | 11/2014 | Velusamy |
| 9,069,382 | B1 | 6/2015 | Starner et al. |
| 9,213,714 | B1 | 12/2015 | Ording |
| 9,237,141 | B2 | 1/2016 | Logue et al. |
| 9,438,648 | B2 | 9/2016 | Asenjo et al. |
| 9,709,978 | B2 | 7/2017 | Asenjo et al. |
| 9,937,577 | B2 | 4/2018 | Daniel et al. |
| 9,952,882 | B2 | 4/2018 | Kuscher et al. |
| 2002/0049775 | A1 | 4/2002 | Friedrich et al. |
| 2002/0136432 | A1 | 9/2002 | Koike et al. |
| 2002/0158873 | A1 | 10/2002 | Williamson |
| 2004/0181549 | A1 | 9/2004 | Pate |
| 2005/0010307 | A1 | 1/2005 | Dove et al. |
| 2005/0023347 | A1 | 2/2005 | Wetzel et al. |
| 2005/0188376 | A1 | 8/2005 | Matsumoto et al. |
| 2005/0204315 | A1 | 9/2005 | Knol et al. |
| 2006/0161544 | A1 | 7/2006 | Lee et al. |
| 2006/0241792 | A1 | 10/2006 | Pretlove et al. |
| 2006/0271884 | A1 | 11/2006 | Hurst |
| 2007/0078824 | A1 | 4/2007 | Dorgelo et al. |
| 2008/0007555 | A1 | 1/2008 | Vrba et al. |
| 2008/0072180 | A1 | 3/2008 | Chevalier et al. |
| 2009/0077055 | A1 | 3/2009 | Dillon et al. |
| 2009/0085934 | A1 | 4/2009 | Baier et al. |
| 2009/0086021 | A1 | 4/2009 | Baier et al. |
| 2009/0088875 | A1 | 4/2009 | Baier et al. |
| 2009/0089225 | A1 | 4/2009 | Baier et al. |
| 2009/0112816 | A1 | 4/2009 | Marlow |
| 2009/0125796 | A1 | 5/2009 | Day et al. |
| 2009/0216341 | A1 | 8/2009 | Enkerud et al. |
| 2009/0307162 | A1 | 12/2009 | Bui et al. |
| 2009/0307255 | A1 | 12/2009 | Park |
| 2010/0016995 | A1 | 1/2010 | Barat |
| 2010/0082661 | A1 | 4/2010 | Beaudreau |
| 2011/0022198 | A1 | 1/2011 | Plache et al. |
| 2011/0119227 | A1 | 3/2011 | Wang et al. |
| 2011/0093188 | A1 | 4/2011 | Barkai et al. |
| 2011/0115816 | A1 | 5/2011 | Brackney |
| 2011/0298579 | A1 | 12/2011 | Hardegger et al. |
| 2011/0316884 | A1 | 12/2011 | Giambalvo et al. |
| 2012/0120070 | A1 | 5/2012 | Baillot |
| 2012/0233573 | A1 | 9/2012 | Sullivan et al. |
| 2012/0242648 | A1 | 9/2012 | Baier et al. |
| 2012/0249588 | A1 | 10/2012 | Tison et al. |
| 2012/0249741 | A1 | 10/2012 | Maciocci et al. |
| 2012/0254792 | A1 | 10/2012 | Husoy et al. |
| 2012/0259436 | A1 | 10/2012 | Resurreccion et al. |
| 2012/0296635 | A1 | 11/2012 | Brockett et al. |
| 2012/0300089 | A1 | 11/2012 | Sbaiz et al. |
| 2012/0314571 | A1 | 12/2012 | Forssell |
| 2012/0320088 | A1 | 12/2012 | Ihara et al. |
| 2013/0006395 | A1 | 1/2013 | Plache et al. |
| 2013/0031508 | A1 | 1/2013 | Kodosky et al. |
| 2013/0054573 | A1 | 2/2013 | Snellman et al. |
| 2013/0073400 | A1 | 3/2013 | Heath |
| 2013/0110978 | A1 | 5/2013 | Gordon et al. |
| 2013/0120449 | A1 | 5/2013 | Ihara et al. |
| 2013/0124253 | A1* | 5/2013 | Cooper .............. G06Q 10/0633 |
| | | | 705/7.26 |
| 2013/0124465 | A1* | 5/2013 | Pingel .................. G06F 3/0604 |
| | | | 707/610 |
| 2013/0124613 | A1 | 5/2013 | Plache et al. |
| 2013/0125233 | A1 | 5/2013 | Bush et al. |
| 2013/0169681 | A1 | 7/2013 | Rasane et al. |
| 2013/0211546 | A1 | 8/2013 | Lawson et al. |
| 2013/0211559 | A1 | 8/2013 | Lawson et al. |
| 2013/0222373 | A1 | 8/2013 | Weinstein et al. |
| 2013/0246539 | A1 | 9/2013 | Davis |
| 2013/0083012 | A1 | 10/2013 | Han et al. |
| 2013/0257863 | A1 | 10/2013 | Mikkelsen |
| 2013/0275908 | A1 | 10/2013 | Reichard |
| 2013/0290899 | A1 | 10/2013 | Amran |
| 2014/0032849 | A1* | 1/2014 | De Vleeschauwer ...................... |
| | | | G06F 17/30902 |
| | | | 711/133 |
| 2014/0047064 | A1 | 2/2014 | Maturana et al. |
| 2014/0047106 | A1 | 2/2014 | Leung et al. |
| 2014/0047107 | A1 | 2/2014 | Maturana et al. |
| 2014/0143395 | A1 | 5/2014 | Geltner et al. |
| 2014/0207870 | A1 | 7/2014 | Vaya |
| 2014/0240356 | A1 | 8/2014 | Cupitt et al. |
| 2014/0250377 | A1 | 9/2014 | Bisca et al. |
| 2014/0253588 | A1 | 9/2014 | Mandala |
| 2014/0258940 | A1 | 9/2014 | Han et al. |
| 2014/0282215 | A1 | 9/2014 | Grubbs et al. |
| 2014/0316540 | A1 | 10/2014 | Loncar et al. |
| 2014/0335480 | A1 | 11/2014 | Asenjo et al. |
| 2014/0336785 | A1 | 11/2014 | Asenjo et al. |
| 2014/0358256 | A1 | 12/2014 | Billi et al. |
| 2015/0077555 | A1 | 3/2015 | Scalisi |
| 2015/0146007 | A1 | 5/2015 | Dusik et al. |
| 2015/0213465 | A1 | 7/2015 | Noyes et al. |
| 2015/0281329 | A1* | 10/2015 | Dimov .................. H04L 67/10 |
| | | | 709/217 |
| 2015/0371455 | A1 | 12/2015 | Abdel-Rahman et al. |
| 2016/0103750 | A1 | 4/2016 | Cooper et al. |
| 2016/0127690 | A1 | 5/2016 | Kaehler et al. |
| 2016/0132538 | A1 | 5/2016 | Bliss et al. |
| 2016/0132595 | A1 | 5/2016 | Bliss et al. |
| 2016/0176724 | A1 | 6/2016 | Ji et al. |
| 2016/0217381 | A1 | 7/2016 | Bloomquist et al. |
| 2016/0226731 | A1 | 8/2016 | Maroulis |
| 2016/0267759 | A1 | 9/2016 | Kerzner |
| 2016/0274553 | A1 | 9/2016 | Strohmenger et al. |
| 2016/0292895 | A1 | 10/2016 | Billi et al. |
| 2016/0321841 | A1 | 11/2016 | Christen et al. |
| 2016/0322078 | A1 | 11/2016 | Bose et al. |
| 2016/0337289 | A1 | 11/2016 | Duca et al. |
| 2016/0337441 | A1 | 11/2016 | Bloomquist et al. |
| 2016/0343163 | A1 | 11/2016 | Venkatesha et al. |
| 2017/0032574 | A1 | 2/2017 | Sugaya |
| 2017/0053445 | A1 | 2/2017 | Chen et al. |
| 2017/0060379 | A1 | 3/2017 | Capozella et al. |
| 2017/0091607 | A1 | 3/2017 | Emeis et al. |
| 2017/0108838 | A1 | 4/2017 | Todeschini et al. |
| 2017/0116259 | A1 | 4/2017 | Elliot et al. |
| 2017/0195265 | A1 | 7/2017 | Billi et al. |
| 2017/0210017 | A1 | 7/2017 | Yamamoto et al. |
| 2017/0213387 | A1 | 7/2017 | Bean et al. |
| 2017/0270362 | A1 | 9/2017 | Barnehama et al. |
| 2017/0300753 | A1 | 10/2017 | Billi et al. |

(56) References Cited

U.S. PATENT DOCUMENTS

| | | | |
|---|---|---|---|
| 2017/0337352 | A1 | 11/2017 | Williams |
| 2018/0054432 | A1 | 2/2018 | Bailey et al. |
| 2018/0075759 | A1* | 3/2018 | Kim .................... G08G 5/0069 |
| 2018/0222052 | A1 | 8/2018 | Vu et al. |
| 2018/0349654 | A1 | 12/2018 | Takeshima et al. |
| 2019/0156584 | A1 | 5/2019 | Herman et al. |

FOREIGN PATENT DOCUMENTS

| | | |
|---|---|---|
| EP | 1906289 | 4/2008 |
| EP | 2077473 | 7/2009 |
| EP | 2 380 709 A2 | 10/2011 |
| EP | 2592812 | 5/2013 |
| EP | 2801935 | 11/2014 |
| EP | 2 927 854 A1 | 10/2015 |
| EP | 2 942 717 A1 | 11/2015 |
| EP | 2940544 | 11/2015 |
| EP | 3 018 597 A1 | 5/2016 |
| EP | 3 037 901 A2 | 6/2016 |
| EP | 3032480 | 6/2016 |
| EP | 3 076 253 A1 | 10/2016 |
| EP | 3 086 193 A1 | 10/2016 |
| JP | 2008-201101 A | 9/2008 |
| JP | 2016-010145 A | 1/2016 |
| WO | 2016/057386 A1 | 4/2016 |

OTHER PUBLICATIONS

Microsoft HoloLens demo onstage at BUILD 201, https://www.youtube.com/watch?v=3AADEqLIALk, 2 pages.

European Office Action for EP Patent Application Serial No. 16196582.7, dated Feb. 14, 2018, 7 pages.

European Office Action for EP Patent Application Serial No. 17150085.3, dated Dec. 19, 2017, 5 pages.

Extended European Search Report for EP Patent Application Serial No. 17178555.3 dated Jan. 8, 2018, 73 pages.

Extended European Search Report for EP Patent Application Serial No. 17150085.3-1802 dated May 10, 2017, 8 pages.

Non-Final Office Action for U.S. Appl. No. 141675,129, dated May 4, 2017, 58 pages.

Non-Final Office Action for U.S. Appl. No. 15/391,213, dated May 9, 2018, 79 pages.

Communication pursuant to Rule 69 EPC for EP Patent Application Serial No. 17186540.5 dated Apr. 4, 2018, 2 pages.

Communication pursuant to Rule 69 EPC for EP Patent Application Serial No. 17178556.1 dated Feb. 26, 2018, 2 pages.

Communication pursuant to Rule 69 EPC for EP Patent Application Serial No. 17178555.3 dated Feb. 26, 2018, 2 pages.

Extended European Search Report for European Application Serial No. 17200575.3 dated Apr. 17, 2018, 8 pages.

Extended European Search Report for European Application Serial No. 17200580.3 dated Apr. 17, 2018, 8 pages.

Chinese Office Action for Chinese Application Serial No. 201610187424.2 dated Mar. 9, 2018, 6 pages.

Non-Final Office Action received for U.S. Appl. No. 15/170,676, dated May 24, 2018, 163 pages.

Communication pursuant to Rule 69 EPC for EP Patent Application Serial No. 17200575.3 dated May 22, 2018, 2 pages.

Communication pursuant to Rule 69 EPC for EP Patent Application Serial No. 17200580.3 dated May 22, 2018, 2 pages.

Non-Final Office Action received for U.S. Appl. No. 14/987,399 dated Jun. 1, 2018, 83 pages.

Final Office Action received for U.S. Appl. No. 14/928,305 dated Jun. 5, 2018, 16 pages.

Final Office Action received for U.S. Appl. No. 15/241,354, dated Jul. 11, 2018, 80 pages.

Non-Final Office Action received for U.S. Appl. No. 15/240,161, dated Jul. 27, 2018, 54 pages.

Rockwell Automation. The Power of Collaboration Working for you: PartnerNetwork Solutions from Rockwell Automation; Win-911 Software; Publication ENCOMP-BROO7B-EN-P—Dec. 2013.

Extended European Search Report for EP Patent Application Serial No. 16161305.4, dated Sep. 5, 2016, 10 pages.

European Office Action for EP Patent Application Serial No. 16161305.4, dated Oct. 10, 2016, 2 pages.

European Office Action for European Patent Application Serial No. 16196582.7-1871 dated Jan. 31, 2017, 9 pages.

Extended European Search Report for European Application Serial No. 17200391.5 dated Jan. 18, 2018, 7 pages.

Communication Pursuant to Article 94(3) EPC Received for EP Patent Application No. 16161305.4 dated Sep. 8, 2017, 7 pages.

Extended European Search Report for EP Patent Application Serial No. 17178556.1-1871 dated Aug. 23, 2017, 10 pages.

Extended European Search Report for EP Patent Application Serial No. 17186540.5-1958 dated Sep. 28, 2017, 8 pages.

European Office Action for EP Patent Application Serial No. 16196582.7, dated May 9, 2017, 2 pages.

Final Office Action for U.S. Appl. No. 14/675,129, dated Dec. 1, 2017, 63 pages.

Office Action for U.S. Appl. No. 14/928,305, dated Dec. 22, 2017, 24 pages.

Final Office Action for U.S. Appl. No. 15/391,213, dated Oct. 25, 2018, 67 pages.

Non-Final Office Action for U.S. Appl. No. 14/928,305, dated Dec. 31, 2018, 19 pages.

Final Office Action received for U.S. Appl. No. 15/170,676, dated Dec. 26, 2018, 46 pages.

Non-Final Office Action for U.S. Appl. No. 15/718,907, dated Dec. 14, 2018, 75 pages.

Chinese Second Office Action for Chinese Application Serial No. 201610187424.2 dated Sep. 4, 2018, 11 pages (Including English Translation).

Non-Final Office Action for U.S. Appl. No. 15/465,246 dated Jan. 24, 2019, 411 pages.

Communication pursuant to Rule 94(3) EPC for EP Patent Application Serial No. 17186540.5 dated Feb. 21, 2019, 5 pages.

Non-Final Office Action for U.S. Appl. No. 15/718,856 dated Mar. 5, 2019, 68 pages.

Non-Final Office Action received for U.S. Appl. No. 15/170,676 dated May 13, 2019, 36 pages.

Final Office Action received for U.S. Appl. No. 15/718,856 dated May 24, 2019, 27 pages.

Communication pursuant to Article 94(3) EPC received for EP Patent Application Serial No. 17200575.3 dated Apr. 5, 2019, 5 pages.

Extended European Search Report received for EP Patent Application Serial No. 18205904.8 dated Apr. 3, 2019, 11 pages.

Makris et al., "Augmented reality system for operator support in human-robot collaborative assembly", CIRP Annals—Manufacturing Technology, vol. 65, No. 1, May 12, 2016, pp. 61-64.

Communication pursuant to Rule 69 EPC received for EP Patent Application Serial No. 18205904.8 dated May 20, 2019, 2 pages.

Notice of Allowance received for U.S. Appl. No. 16/165,360 dated Jun. 11, 2019, 49 pages.

First Office Action received for Chinese Patent Application Serial No. 201710001412.0 dated Aug. 16, 2019, 14 pages (Including English Translation).

Final Office Action received for U.S. Appl. No. 15/170,676 dated Aug. 14, 2019, 44 pages.

Non-Final Office Action received for U.S. Appl. No. 16/502,491 dated Aug. 22, 2019, 44 pages.

* cited by examiner

SELECTIVE ONLINE AND OFFLINE ACCESS TO SEARCHABLE INDUSTRIAL AUTOMATION DATA

CROSS-REFERENCE TO RELATED APPLICATIONS

This application claims priority to U.S. Provisional Application Ser. No. 62/399,992, filed on Sep. 26, 2016, and entitled "SELECTIVE ONLINE AND OFFLINE ACCESS TO SEARCHABLE INDUSTRIAL AUTOMATION DATA," the entirety of which is incorporated herein by reference.

BACKGROUND

The subject matter disclosed herein relates generally to industrial automation systems, and, more particularly, to industrial data search systems.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for searching industrial data is provided, comprising a discovery component configured to discover available data items distributed across multiple data sources of an industrial environment, wherein the multiple data sources comprise at least a first data source corresponding to a first data platform and a second data source corresponding to a second data platform; an indexing component configured to generate a searchable federated data model that records respective locations of the data items based on information about the available data items generated by the discovery component; and a caching component configured to select a portion of the federated data model to be cached to a remote client device associated with a user identity and to send the portion of the federated data model to the remote client device via one or more wireless networks, wherein the portion of the federated data model is searchable on the remote client device.

Also, one or more embodiments provide a method for providing offline access to an industrial data search system, comprising receiving, by a system comprising a processor, information about available data items located on multiple data sources of an industrial environment, wherein the multiple data sources comprise at least a first data source corresponding to a first data platform and a second data source corresponding to a second data platform; generating, by the system, a federated data model that indexes respective locations of the data items; selecting, by the system, a subset of the federated data model to be cached on a remote client device associated with a user identity; and sending, by the system, the subset of the federated data model to the remote client device via one or more wireless networks, wherein the subset of the federated data model is searchable on the remote client device.

Also, according to one or more embodiments, a non-transitory computer-readable medium is provided having stored thereon instructions that, in response to execution, cause a system to perform operations, the operations comprising receiving information about available data items located on multiple data sources of an industrial environment, wherein the multiple data sources comprise at least a first data source corresponding to a first data platform and a second data source corresponding to a second data platform; generating a federated data model that indexes respective locations of the data items; selecting a portion of the federated data model to be cached on a remote client device associated with a user identity; and sending the portion of the federated data model to the remote client device via one or more wireless networks, wherein the portion of the federated data model is searchable on the remote client device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
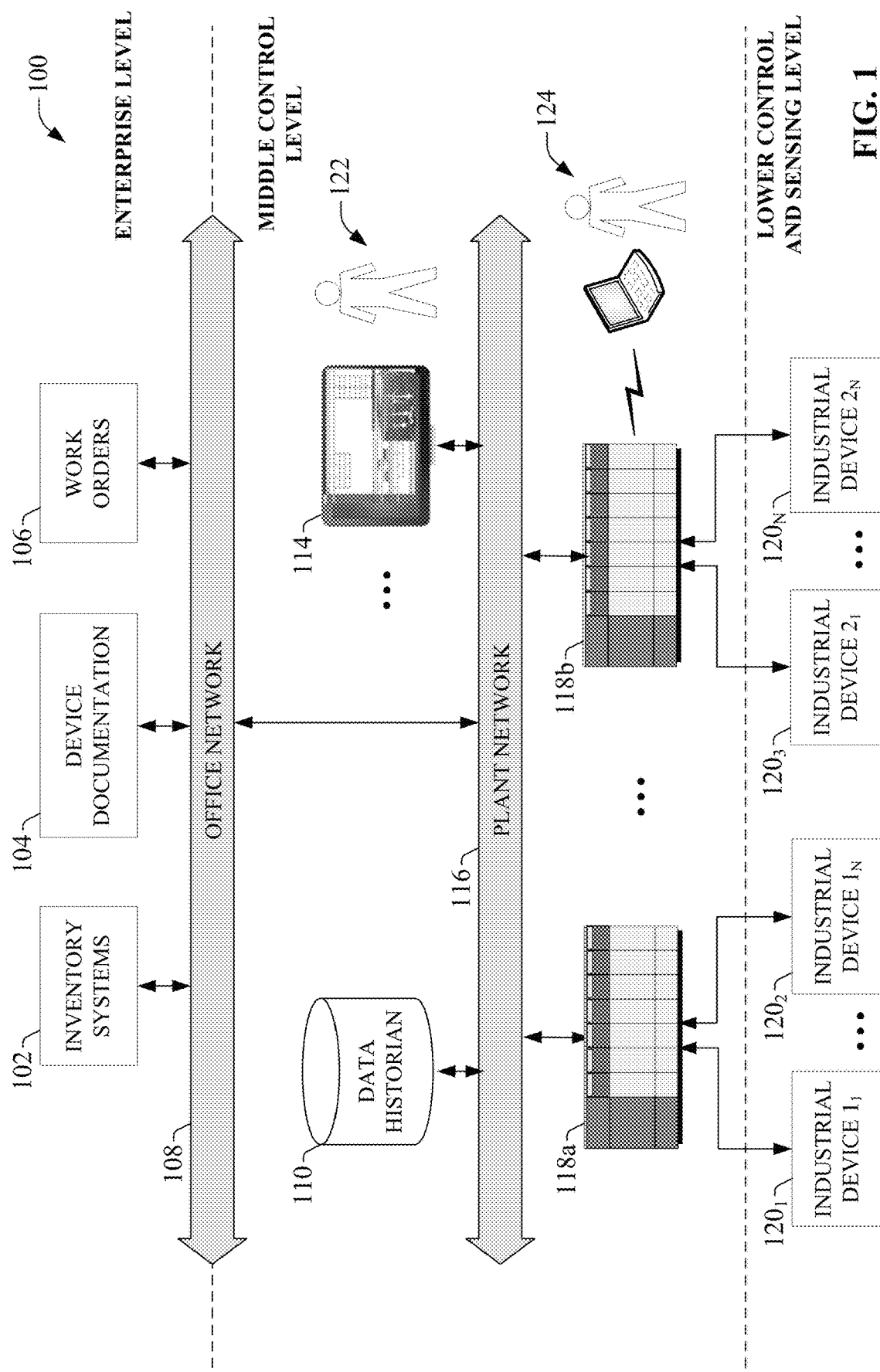
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Industrial controllers 118 and HMIs 114 comprise two sources of information relating to the industrial processes and systems being controlled within the plant environment. Since HMIs 114 leverage data from industrial controllers 118 (or read directly from controlled industrial devices or other I/O devices in some scenarios) to facilitate visualization of the controlled systems, both the industrial controllers 118 and the HMIs 114 may contain information relating a common aspect of the industrial systems. For example, the control programming (e.g., ladder logic, sequential function chart, etc.) for controlling operation of a particular tank used in a batch process may execute on one of the industrial controllers 118, while the operator interface screens for viewing a graphical representation of the tank's current status and relevant setpoints (e.g., level setpoints, maximum flow setpoints, etc.) may be viewed on one of the HMIs 114. However, since these two sources of information are segregated across two different data sources and platforms, operators and maintenance personnel are typically only able to view one source of information at a time. That is, operators may choose to view the operator interface screens for the tank of interest on the relevant HMI terminal (see operator 122), or may connect a personal computing device (e.g., a laptop or tablet computer) to the industrial controller to view the control programming used to control the tank's operation (see operator 124). In most cases, the operator must be in physical proximity to either the HMI terminal or the industrial controller in order to view the information on that particular data source. Consequently, during troubleshooting of maintenance issues involving the tank, personnel must travel to the source of the information (e.g., the HMI terminal or industrial controller, which are often located near the physical machine being controlled) and locally search each of the HMI and the industrial controller individually.

Some industrial environments may also include other sources of potentially relevant information relating to specific aspects of the controlled industrial systems. These may include, for example, a data historian 110 that aggregates and stores production information collected from the industrial controllers 118 or other data sources, or a device documentation store 104 containing electronic documentation for the various industrial devices making up the controlled industrial systems. Other information sources may include an inventory tracking system 102, a work order management system 106, repositories for machine or process drawings and documentation, vendor product documentation storage, vendor knowledgebases, internal knowledgebases, or other such systems, some or all of which may reside on an office network 108 of the industrial environment. These diverse information sources are spread across many locations and systems both within the plant environment and externally (e.g., on the Internet). When diagnosing problems, maintenance personnel are often required to search several of these sources of information individually, using several different software packages specific to the respective data sources being searched. Moreover, searching for information pertaining to a particular device or machine often requires an extensive knowledge of the overall industrial system in order to locate the data source (e.g., industrial controllers, HMIs, etc.), to be searched, as well as to identify the relevant operator screens and control program routines. Individually searching each of these data sources in connection with solving a system downtime issue or other problem can delay correction of maintenance issues, resulting in lost revenue and scheduling problems.

Figure 2:
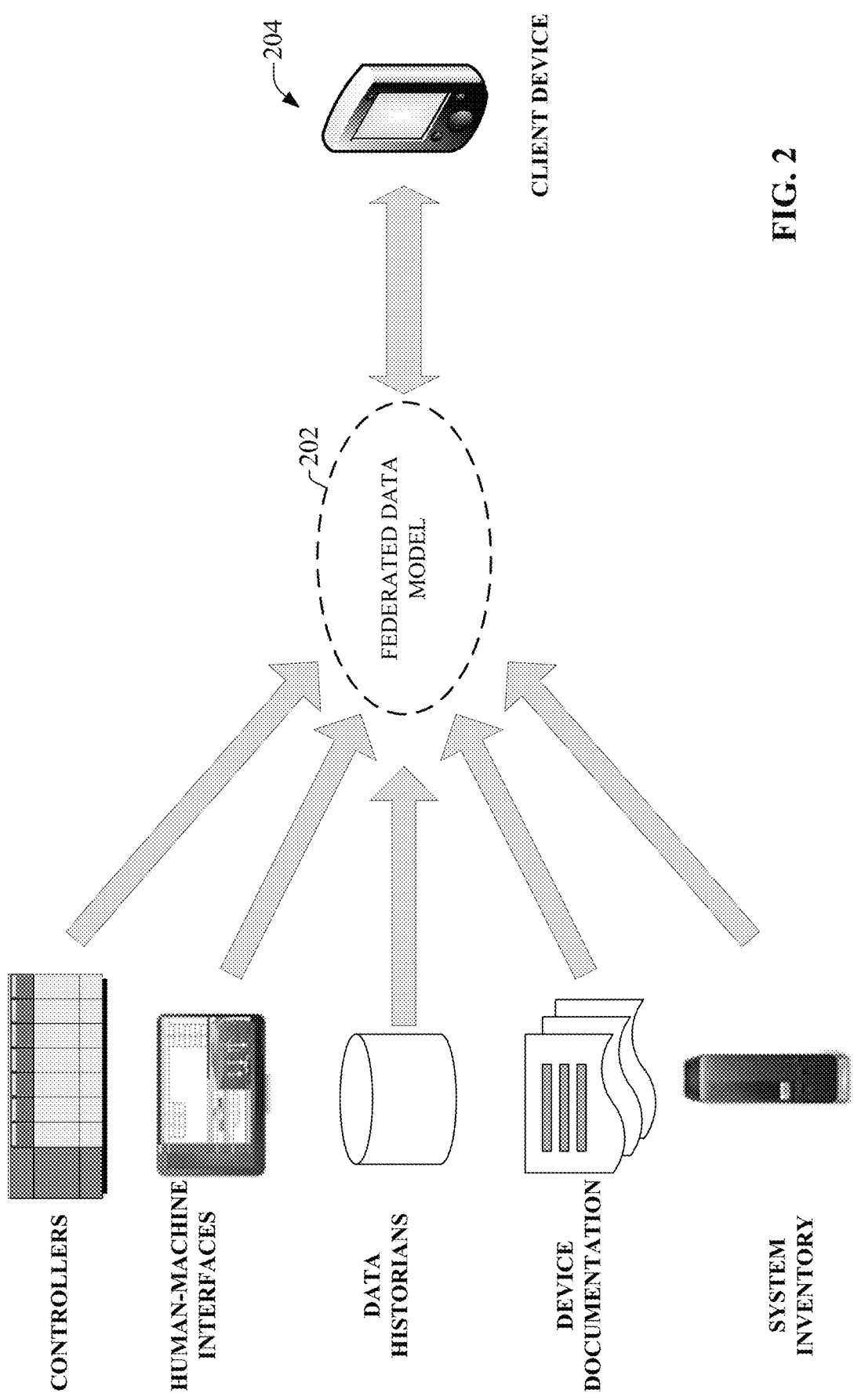
FIG. 2 is a conceptual diagram illustrating industrial data federation.

To address these and other issues, one or more embodiments of the present disclosure provide an industrial data discovery and indexing system that discovers available data items across multiple heterogeneous data platforms that make up an industrial enterprise and indexes the data items in a unified searchable namespace. The discovery and indexing system can be a component of a multi-platform industrial search system that allows a user to search multiple disparate industrial data platforms for information of interest. The discovery and indexing system unifies plant-wide control system information from multiple diverse sources under a common namespace, or federated data model. FIG. 2 is a conceptual diagram illustrating this industrial data federation. In one or more embodiments, the discovery and indexing system indexes data from multiple sources both across the industrial facility and external to the facility, including but not limited to industrial controllers, HMIs, intelligent industrial devices, data historians, device and system documentation repositories (e.g., drawings, manuals, knowledgebase articles, etc.), system inventory management systems, computer-based control applications (e.g., enterprise resource planning systems, batch process management systems, etc.), batch software, product control software, structured query language (SQL) databases that interact with the control system, and/or other such platforms. The system indexes and correlates this multi-platform data to yield a federated data model 202 that can be accessed and searched by a client device 204.

In an example scenario, client device 204 may submit a search request for a particular data tag (e.g., Tank1) to the federated data model 202. Based on the indexed plant-wide information recorded in the model, the industrial search system can locate all instances of the specified data tag across the disparate data sources and deliver a list of all discovered instances categorized according to data platform. For example, the search system may provide a categorized search result list that includes a first list of discovered references to the data tag in one or more industrial control programs (e.g., ladder logic, sequential function charts, etc.), and a second list of discovered instances of the data tag being displayed on one or more HMI screens. In response to selection of a search result in the industrial controller list result, the search system remotely launches an instance of the appropriate controller development application on the client device and navigates to the portion of the control program (e.g., a ladder logic rung) corresponding to the selected instance. Likewise, selection of a search result in the HMI result list causes the search system to launch a runtime instance of the HMI visualization application on the client device, and to navigate to the display screen corresponding to the selected instance.

The discovery and indexing system can build and maintain federated data model 202 automatically or semi-automatically in a number of ways. In some embodiments, the system can deploy a discovery agent on the plant network. The discovery agent may comprise, for example, a software script that crawls the network to discover industrial devices and other data sources—both internal to the plant as well as external sources—containing available data items. The discovery agent can report the discovered data items to the discovery and indexing system, which converts the data to a common searchable format, contextualizes the data using predefined or automatically generated tags, identifies any interdependencies between the data items, and indexes the data in the federated data model for subsequent searching. In another scenario, some industrial devices compatible with the indexing system may push information regarding their available data items to the system for tagging and indexing.

In yet another example, a user's client device (e.g., personal mobile phone, wearable computer, etc.) can be used to collect information about an industrial automation system in proximity to the client device. This collected information can comprise, for example, photographic images, video, audio recordings, entered textual information or other types of information. A client application executing on the client device can package this collected information in a format compatible with the data model 202, where the packaged information represents a newly created portion of the federated data model describing the local automation system. The client application can then submit the model portion to the search system, which can integrate the newly generated portion of the model into the larger federated data model.

To allow the search system to be used at locations with limited wireless access to the Internet or the cloud platform on which the search system executes—such as industrial sites located at remote environments with little or no internet access—one or more embodiments of the search system can be configured to selectively cache all or portions of the federated data model to a user's personal device at certain times, allowing these portions of the model to be accessed and searched locally on the user's device without being online with the higher level indexing system. In such embodiments, the system can infer which portions of the federated data model are relevant to the user based on user-specific criteria, such as an identity of a project the user is known to be involved with, a history of searches submitted by the user to the federated data model, a role associated with the user, a current or predicted context of the user, etc. While the user's client device has online access to the indexing and search system, the system can automatically download the selected portion of the data model to the user's client device to be cached locally to the device for local access.

Figure 3:
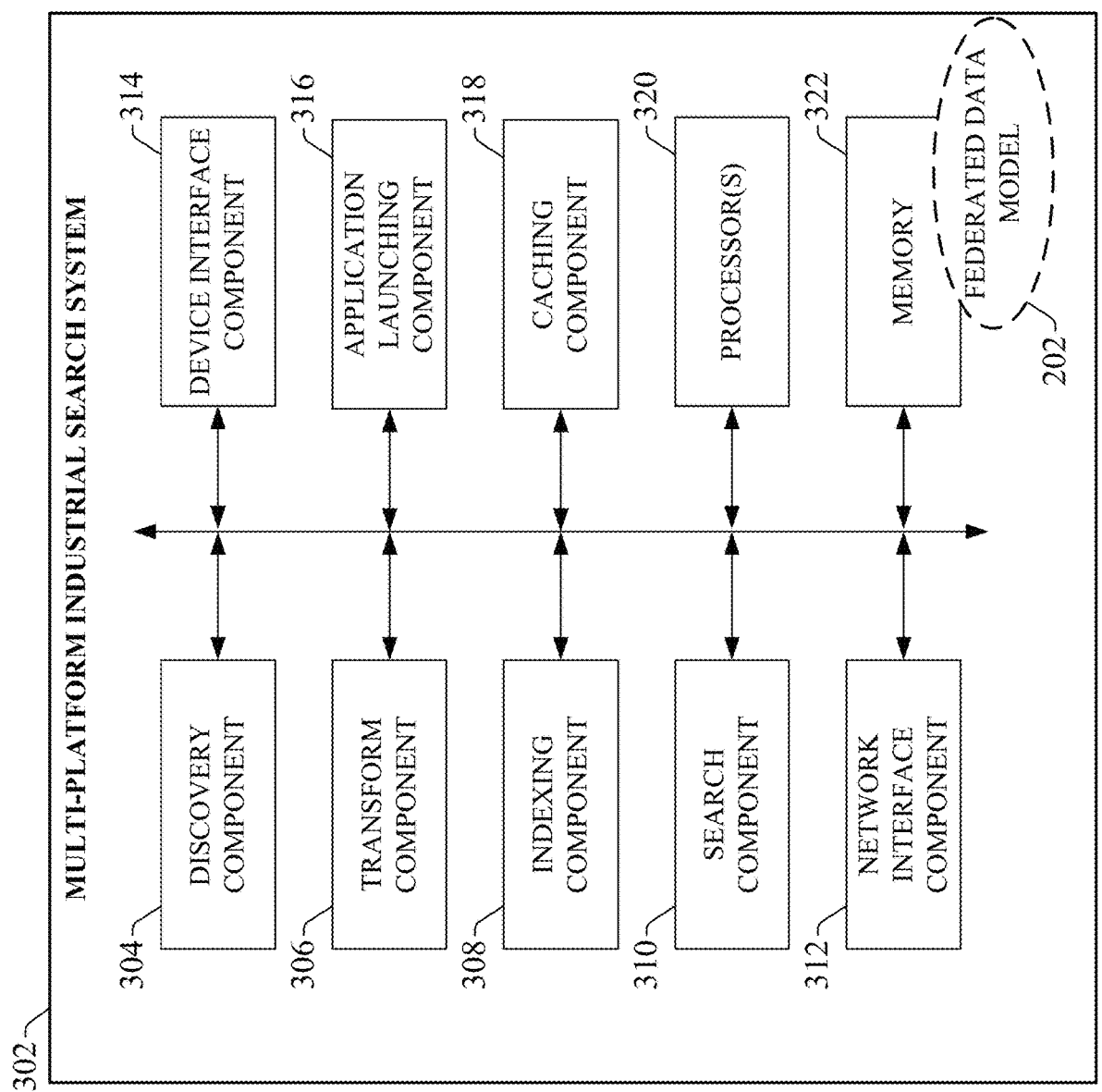
FIG. 3 is a block diagram of an example multi-platform industrial search system.

FIG. 3 is a block diagram of an example multi-platform industrial search system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Multi-platform industrial search system 302 can include a discovery component 304, a transform component 306, an indexing component 308, a search component 310, a network interface component 312, a device interface component 314, an application launching component 316, a caching component 318, one or more processors 320, and memory 322. In various embodiments, one or more of the discovery component 304, transform component 306, indexing component 308, search component 310, network interface component 312, device interface component 314, application launching component 316, caching component 318, the one or more processors 320, and memory 322 can be electrically and/or communicatively coupled to one another to perform one or more of the functions of the industrial search system 302. In some embodiments, components 304, 306, 308, 310, 312, 314, 316, and 318 can comprise software instructions stored on memory 322 and executed by processor(s) 320. Multi-platform industrial search system 302 may also interact with other hardware and/or software components not depicted in FIG. 3. For example, processor(s) 320 may interact with one or more external user interface devices, such as a keyboard, a mouse, a display monitor, a touchscreen, or other such interface devices.

Discovery component 304 can be configured to gather information from one or more industrial automations and other data sources both internal and external to an industrial environment. The discovery component 304 can also be configured to discover interdependencies between the data items. Transform component 306 can be configured to transform and tag the data discovered by the discovery component prior to indexing. This can include, for example, transforming heterogeneous data items discovered on different types of data platforms to a homogeneous format for indexing under a common namespace, tagging the discovered data with relevant contextual information—e.g., a plant, production area, machine, or device on which the data was discovered; a relationship or interdependency between a given data item and another data item; a data platform corresponding to the data item (e.g., industrial control program, HMI application, knowledgebase article, device documentation, etc.)—or other data modifications. The indexing component 308 can be configured to generate a federated data model (e.g., federated data model 202) defining locations and sources of data items throughout the industrial system, as well as relationships between the data items, based on the discovered and transformed data. The resulting federated data model is capable of identifying and reporting sources of specific data items or tags, as well as relevant contextual data relating to a specified data item.

Search component 310 can be configured to submit search queries to the federated data model and retrieve search results identifying locations of requested data items throughout the industrial system. Search component 310 can be configured to classify the search results according to the platform of the respective data sources on which the results were found (e.g., control logic, HMI, etc.), as well as the network and/or physical location (e.g., production area) in which the information is located. For search results corresponding to web content (e.g., vendor knowledgebase websites), the search component 310 can generate links that facilitate direct navigation to the web content. Network interface component 312 can be configured to exchange information between the industrial data search system 302 and a plant network and/or external network (e.g., a public network such as the Internet). This communication can include, for example, deployment of data discovery agents and receipt of discovered data items from the discovery agents or directly from data sources themselves.

Device interface component 314 can be configured to exchange information between the multi-platform industrial search system 302 and a client device having authorization to access the system. For example, the device interface component can receive search queries from the client device for submission to the federated data model, as well as deliver search results and notifications to the client device. Device interface component 314 can also be used to send selected subsets of the federated data model 202 to the client device for local caching, and to receive sub-models from the client device for integration with the federated data model 202.

Application launching component 316 can be configured to remotely launch appropriate platform-specific applications on the client device (or another device such as a standalone maintenance workstation) in response to selection of a search result. For example, in response to selection of a search result identifying a control logic rung on which a specified data tag is referenced, the application launching component 316 can initiate opening a control logic viewing and/or development application on the client device or another device, thereby allowing a user at the client device to view the rung of interest. Similarly, selection of a search result corresponding to an HMI screen on which the specified data tag is referenced causes the application launching component 316 to open an instance of an HMI viewing application on the client device, allowing the relevant HMI screen to be viewed on the client device. In some embodiments, the application launching component 316 can initiate launching of the platform-specific application by sending a command to a remote server in response to user selection of a search result, and receiving a subsequent command from the server to launch the appropriate application and navigate to the appropriate view. In some scenarios, the remote server may alternatively send the command to launch the application to another computing platform other than the client.

Caching component 318 can be configured to select one or more subsets of the federated data model to be cached locally on a user's client device, and to send the selected subsets to the client device. In one or more embodiments, caching component 318 can select the portion of the federated data model to be locally cached based on information indicative of an industrial automation system of interest to the owner of the client device. Such information can include, for example, a history of searches submitted to the federated data model by the user, a role of the user within an industrial enterprise, a current location or history of locations of the user, an explicit identification of one or more automation systems or plant facilities associated with the user, or other such information.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Figure 4:
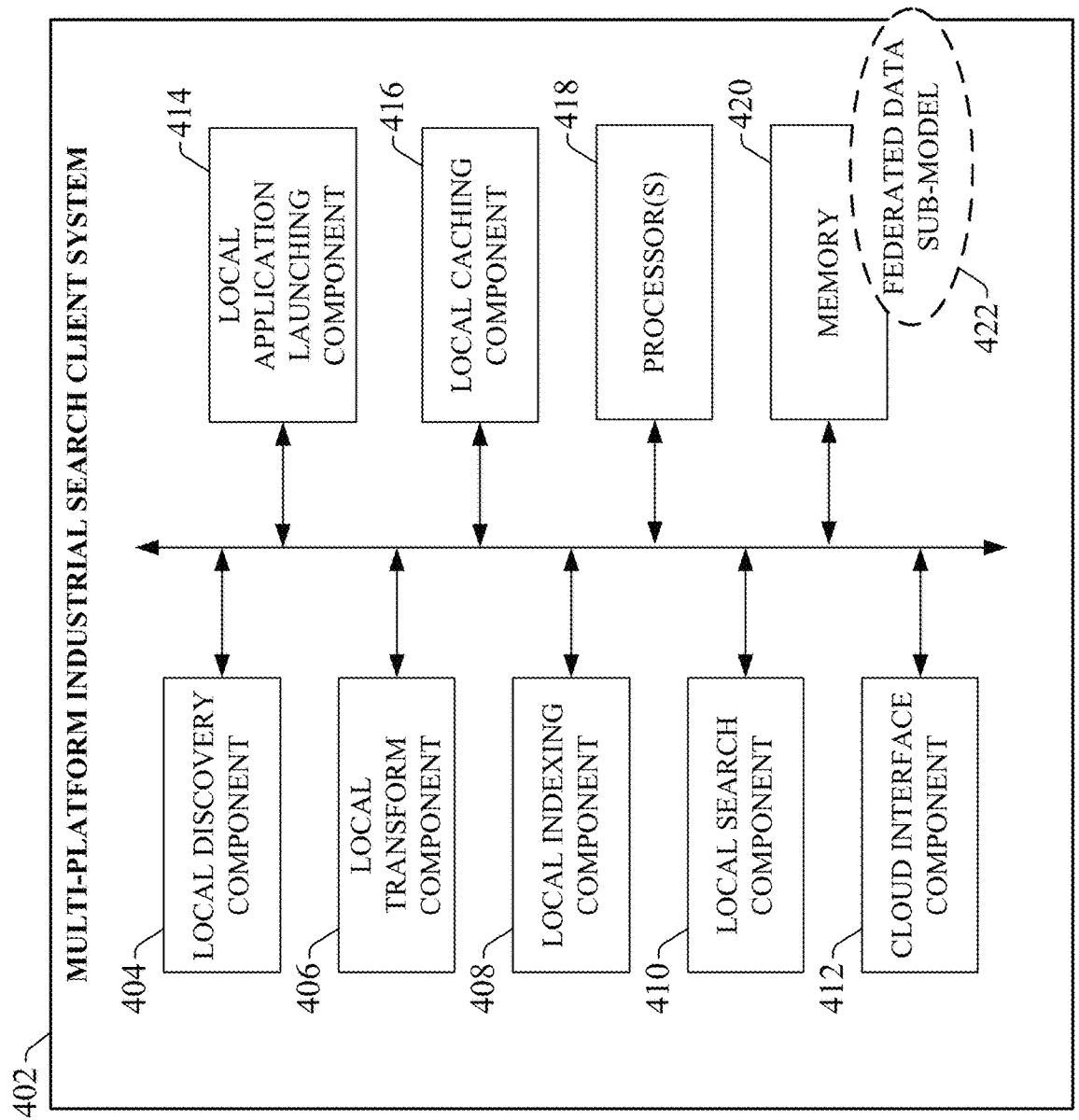
FIG. 4 is a block diagram of an example multi-platform industrial search client system.

FIG. 4 is a block diagram of an example multi-platform industrial search client system 402 according to one or more embodiments of this disclosure. Multi-platform industrial search client system 402 can reside and execute on a client device (e.g., a personal mobile phone, a wearable computer, a laptop computer, a tablet computer, etc.) having remote access to the main industrial search system 302 for at least some periods of time.

Multi-platform industrial search client system 402 can include a local discovery component 404, a local transform component 406, a local indexing component 408, a local search component 410, a cloud interface component 412, a local application launching component 414, a local caching component 416, one or more processors 418, and memory 420. In various embodiments, one or more of the local discovery component 404, local transform component 406, local indexing component 408, local search component 410, cloud interface component 412, local application launching component 414, local caching component 416, the one or more processors 418, and memory 420 can be electrically and/or communicatively coupled to one another to perform one or more of the functions of the industrial search client system 402. In some embodiments, components 404, 406, 408, 410, 412, 414, and 416 can comprise software instructions stored on memory 420 and executed by processor(s) 418. Multi-platform industrial search client system 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Several of the components that make up client system 402 can carry out functions that are similar to analogous components of the main industrial search system 302 described above, but implement these functions locally on the user's client device rather the primary search system 302. For example, local discovery component 404 can be configured to perform similar functions to those of discovery component 304 of the main industrial search system 302, differing primarily in that the information gathered from the one or more industrial devices or other data sources is obtained via the user's client device, using native data collection capabilities of the client device (e.g., wireless or near field connectivity between the client device and an industrial device, text-based input, audio-visual recording functions, etc.). Local transform component 406 can be configured to transform and tag the data discovered by the local discovery component 404 prior to indexing in a local sub-model 422. Local indexing component 408 can be configured to generate or update a federated data sub-model 422 stored locally on the client device's memory 420. Sub-model 422 can be a portion of federated data model 202 that has been received from search system 302 and cached on the client device, or may be a newly created sub-model generated by the local indexing component 408 based on information about a local industrial automation system gathered by the client device (e.g., using local discovery component 404).

Local search component 410 can be configured to submit search queries to the federated data sub-model 422 stored on local memory 420 and retrieve search results identifying locations of requested data items throughout a portion of an industrial system represented by the sub-model. Cloud interface component 412 can be configured to establish a communicative connection between the client device on which client system 402 executes and a cloud platform on which the industrial search system 302 resides. In an example embodiment, cloud interface component 412 can establish this connection to the cloud platform via a wireless connection to a public network (e.g., an Internet layer), and leverage authentication credentials associated with the client device to establish access to the industrial search system 302.

Local application launching component 414 can be configured to launch appropriate platform-specific applications on the client device in response to selection of a search result. Local caching component 416 can be configured to receive a portion of federated data model 202—i.e., a federated data sub-model—from the industrial search system 302 via the cloud platform on which the system 302 resides, and to cache the sub-model in local memory 420 of the client device for local searching or indexing. Local caching component 416 can also be configured to send an updated version of the sub-model 422 to the main industrial search system 302 to be integrated (or re-integrated) into the main federated data model 202 for a given industrial enterprise. This can allow a client device to update portions of the sub-model based on locally obtained information about a particular industrial automation system at the user's current location (e.g., a newly installed or replaced industrial device, a new device configuration, etc.), and to send this updated information to the industrial search system 302 which can then update the larger federated data model 202 to reflect the new information.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
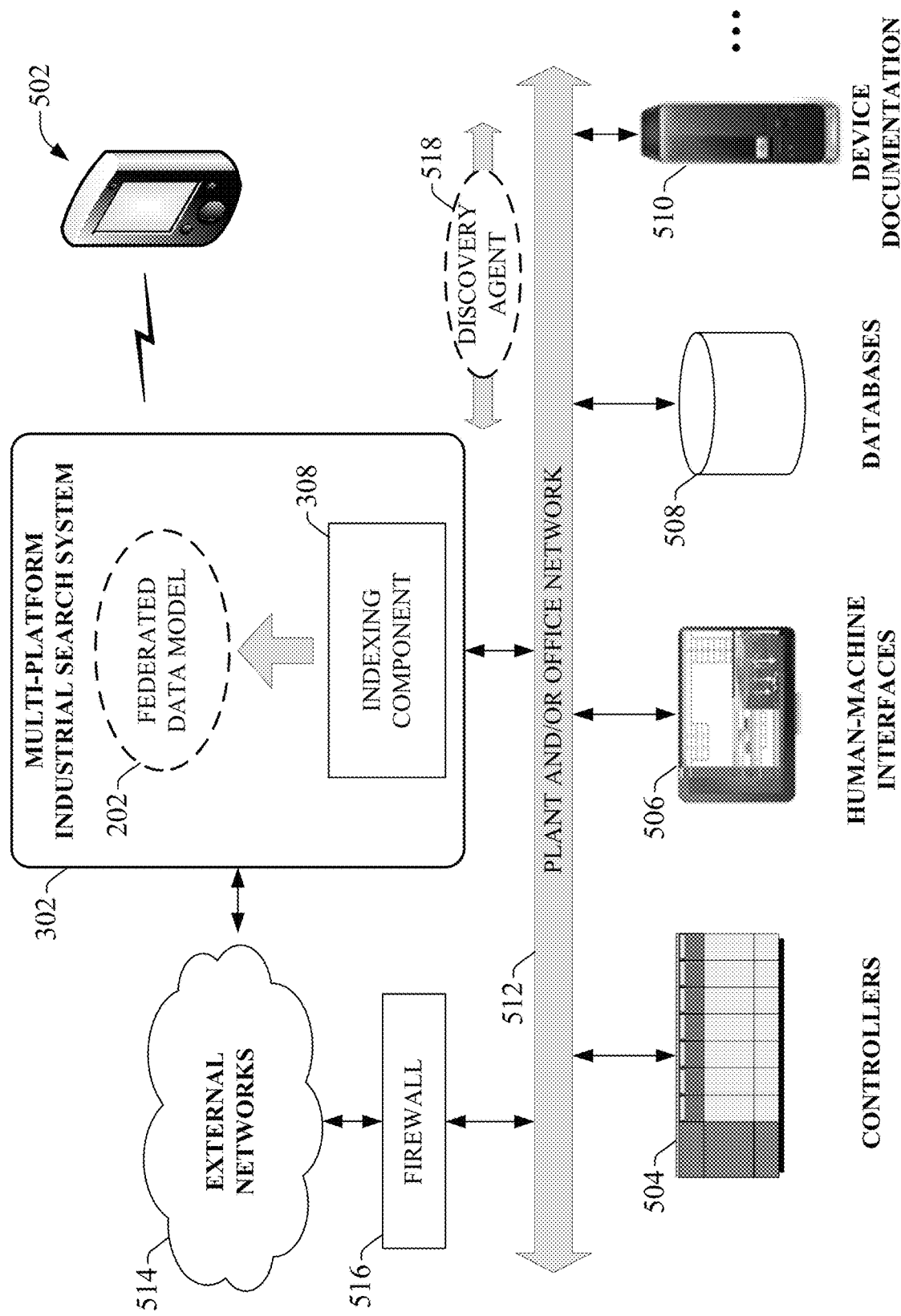
FIG. 5 is a block diagram of a generalized example architecture including an industrial data indexing system that discovers and indexes multi-platform data throughout an industrial environment.

FIG. 5 is a block diagram of a generalized example architecture including a multi-platform industrial search system 302 that discovers and indexes multi-platform data throughout an industrial environment. The example industrial environment depicted in FIG. 5 includes one or more industrial controllers 504, HMIs 506, databases 508 (e.g., data historians, employee databases, inventory databases, etc.), and device documentation repositories 510. The industrial environment may also include other sources of industrial data not depicted in FIG. 5, including but not limited to product inventory tracking systems, work order management systems, etc. Data sources 504-510 reside on a plant and/or office network 512. In some scenarios, data sources 504-510 may be distributed across multiple networks within the plant facility; e.g., a plant network and an office network communicatively connected through a firewall device or other network infrastructure device. Network 512 may also have access to external networks 514 such as the Internet (e.g., via firewall 516).

Multi-platform industrial search system 302—which may also reside on network 512 or may reside on a remote cloud platform accessible via an Internet layer—discovers and indexes data items that are available in the disparate data sources 504-510 as well as on the external networks 514. The industrial search system 302 also indexes relationships between the data items. This can include, for example, recording instances of the same data item residing in multiple data sources (e.g., recording that a data tag corresponding to a particular temperature measurement within one of the industrial controllers 504 corresponds to a data tag within one of the HMIs 506 for displaying the temperature measurement on a display screen), observing that values of certain data items are a function of other data items (e.g., an output coil associated with a first data tag in a ladder logic program is set based on a value of a second data tag used as an output condition for the rung), or other such relationships.

In some embodiments, to facilitate discovery and indexing, the discovery component 304 of search system 302 can deploy a discovery agent 518 on the plant network 512, which traverses the network and discovers data sources (e.g., industrial devices, knowledge bases, device documentation storage devices, work schedules, maintenance record databases, electronic communication records, etc.) and the data items available on each data source. In some embodiments, the discovery agent 518 can also traverse external networks 514 to discover relevant external sources of data, including but not limited to vendor websites or knowledgebases. The discover agent 518 can return information describing the discovered data to the transform component 306 and indexing component 308 of search system 302 for processing and indexing within the federated data model. In this way, the industrial search system 302 automatically inventories a customer's industrial environment by discovering the industrial assets in use and their associated available data items. Industrial search system 302 can also discover relevant data on data sources residing on the external networks 514, including but not limited to device or machine vendor documentation, relevant online knowledgebase articles, vendor product release information, etc.

The search system 302 records the indexed information (that is, the discovered plant-wide data items and their relationships) as a federated data model 202, which can be remotely accessed and searched by a client device 502 to locate desired data items. Client device 502 can be any mobile device (e.g., mobile phone, laptop computer, tablet computer, wearable computer, etc.) or fixed location computer (e.g., desktop computer, server, operator interface, etc.) capable of remotely accessing search system 302. In some embodiments, multi-platform industrial search system 302 may be implemented on a web server, allowing client device 502 to access the federated data model via an Internet connection. The search system 302 may also be implemented on a networked local server accessible by the client device 502 via a wireless network connection. In yet another scenario, the search system 302 may be implemented on a cloud platform, where the search system executes as a cloud-based service.

In an example scenario, client device 502 may submit a search query for a particular data item (e.g., a data tag name) to the search system 302, which initiates a search of the federated data model 202 to facilitate location of the specified data item. The search system 302 then returns a list of search results to the client device 502 identifying all discovered locations of the data item across the various data sources 504-510. The system can classify the results according to type of data source (e.g., data platform) in which the result was found. In some embodiments, the system can also classify the results according to location within the plant environment (e.g. production line, workcell, etc.). For example, the results may include a first list of controller logic results identifying control logic rungs on which the desired data item is referenced, and a second list of HMI screen results identifying HMI screens on which the desired data item is displayed. When a search result is selected at the client device 502, the search system can also remotely launch the appropriate platform-specific application for viewing the selected result (e.g., an HMI viewer, a control logic viewing/development environment, an electronic document reader, etc.).

Figure 6:
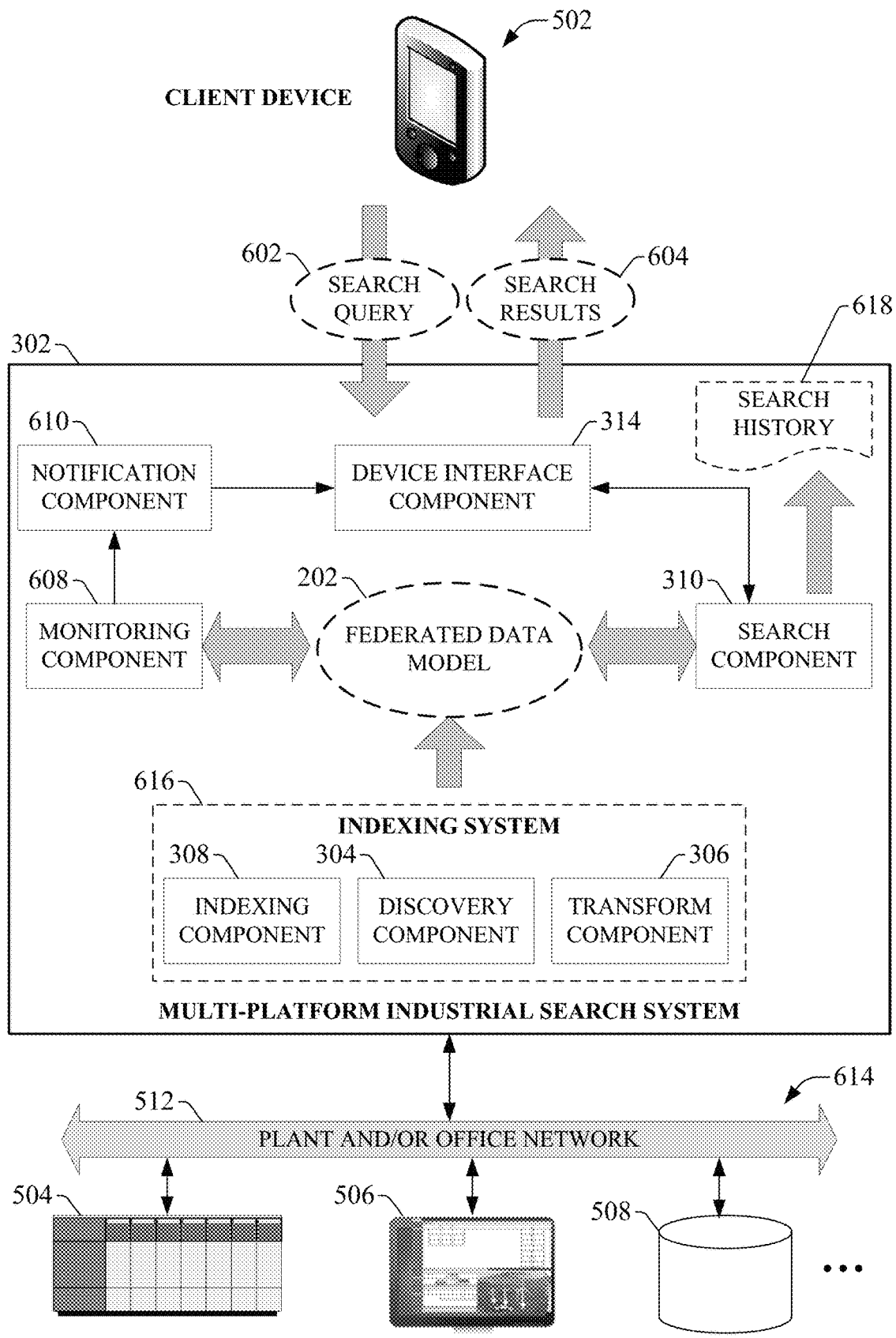
FIG. 6 is a block diagram illustrating components of the multi-platform industrial search system.

FIG. 6 is a block diagram illustrating components of the multi-platform industrial search system 302 in more detail. In some embodiments, the search system may be implemented on a server or other computing device that resides on plant and/or office network 512. In other embodiments, the search system 302 may be implemented on a web server, allowing client devices to remotely search the federated data model 202 via a web connection. In still other embodiments, the search system may be implemented as a cloud-based service that executes on a cloud platform.

Indexing system 616—comprising discovery component 304, transform component 306, and indexing component 308—collects information about available data items distributed across a customer's industrial environment, and generates federated data model 202 representing a searchable unified view of the discovered data. The indexing system 616 is configured to discover data items on multiple disparate platforms, including but not limited to industrial controllers 504, HMIs 506, databases 508, electronic documentation libraries, inventory tracking systems, work order management systems, etc. As will be described in more detail herein, the indexing system 616 can discover available data items by deploying discovery agents 518 on network 512. These agents traverse network 512 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., controller tags, HMI tags, alarms, notifications, events, data values, tabular data, logs, configuration settings, diagnostic values, alarms, HTML pages, etc.), indexing system 616 can manage and deploy device-specific or platform-specific agents configured to extract and analyze information from specific types of devices or data platforms (e.g., controllers, HMIs, etc.). Some device-specific discovery agents can be configured to locate application project files stored on particular device types (e.g., configuration and/or program files on an industrial controller, screen configuration files on an HMI, etc.), and extract relevant information about the devices based on analysis of data contained in these project files. By leveraging device-specific and platform-specific agents, the indexing system 616 can discover and index data conforming to many different formats and platforms.

In order to unify this disparate heterogeneous data under a common platform for collective searching, the discovery agents can transform the collected data to a format understandable by the indexing system 616 (e.g., extensible markup language or other format), and the indexing system 616 can index this transformed data using a common indexing format compatible with the common search platform. The indexing system 616 then encodes this normalized representation of the discovered data in the federated data model 202. By unifying the distributed data under this unified search platform, the system can allow client devices to search the plant-wide data without knowledge of the rules or protocols for reading the various data source platforms (e.g., industrial controllers, HMIs, etc.). In addition to discovery of devices and their associated data via discovery agents deployed on the plant network, some embodiments of indexing system 616 can also be configured to receive uploaded configuration information from devices that support self-identification functionality, as will be described in more detail herein.

Indexing system 616 can also discover and record relationships—both explicit and inferred—between discovered data items. In some embodiments, the indexing system 616 may record these relationships by tagging discovered data items and building the search index based on these tags, such that related data items share common tags. In some scenarios, these tags may be explicitly defined by a system developer such that the indexing component determines which predefined tags should be applied to newly discovered data items.

Using some or all of these techniques, the indexing system 616 can automatically build a model of the customer's industrial environment, including the disparate and multi-platform devices in use throughout the plant, their associated available data items, and relationships between these data items. This eliminates the need for plant personnel to have full knowledge of the industrial assets in use throughout the plant, since indexing system 616 can automatically inventory a given industrial environment and record discovered devices and data in federated data model 202.

Once created by the indexing system 616, federated data model 202 can be searched by search component 310, or by a monitoring component 608 that facilitates automated searching and notifications. Search component 310 is configured to search federated data model 202 in response to a search query 602 submitted by a client device 502. Client device 502 can exchange data with the multi-platform industrial search system 302 via device interface component 314, which may comprise a wired or wireless network interface, a near field communication interface, or other such device interface suitable for the particular platform on which the search system is implemented. In some embodiments, device interface component 314 may be configured to verify an authorization of the client device 502 to access the search system prior to allowing search queries to be submitted by the client device. The device interface component 314 may authenticate the client device or its owner using password verification, biometric identification, cross-referencing an identifier of the client device with a set of known authorized devices, or other such verification techniques.

In some embodiments, the device interface component 314 may be configured to serve an interface display or dashboard to the client device 502 when the client device requests access to the search system 302. The interface display can include interface elements that allow the user of client device 502 to manually enter and submit a search query 602 to the search system 302. For example, the display may allow the user to enter a keyword, term, or phrase as a search criterion. Example search terms may include identifiers of specific devices or machines, names of production areas within the plant, product names or codes, employee names, or other such criteria. Search terms can also be entered as an expression comprising multiple phrases separated by Boolean AND and OR operators in order to refine the search (e.g., an expression "Name-Pack OR Name-Sort AND Type-Energy" may initiate a search for energy usage information in sortation and packing systems). In addition to manually entered search criteria, some embodiments of the device interface component 314 can be configured to translate barcodes or Quick response (QR) codes affixed to devices or machines. For example, a user may scan or photograph a barcode or QR code attached to a device, machine, or product (e.g., a pin-stamped or laser-etched barcode affixed to a workpiece during the production process) using client device 502, wherein the barcode contains identification information about the associated component. The client device 502 can then submit identification information extracted from the barcode to the device interface component 314 as a search criterion. In yet another example, client device 502 may extract information about an industrial device or its associated process directly from the device via near field communication (NFC) and submit the extracted information to the device interface component 314. This extracted information can include, but is not limited to, a device identifier, device status information read from a status word maintained on the industrial device, alarm data extracted from an alarm register, production statistics stored on one or more data tags, or other such information.

Upon receipt of search query 602, device interface component 314 routes the query to search component 310, which searches federated data model 202 for content relevant to the search query. Search query 602 may comprise, for example a data tag name (e.g., Tank1), a device or machine attribute, a device vendor, a name of a particular area of the industrial environment (e.g., a workcell or production line), a product name or identifier, or other such search criteria. Search component 310 searches the federated data model 202 for the search criteria identified by the search query 602, identifies data items corresponding to the search criteria, and returns a list of search results 604 to the client device via device interface component 314. Since the search results 604 may correspond to data items found on multiple disparate platforms throughout the plant environment (e.g., industrial controllers, HMIs, device documentation repositories, etc.), the device interface component classifies the results according to the platforms on which the results were found, location of the results within the plant environment (e.g., production area, workcell, etc.), or other classification criteria.

The search component 310 can also maintain search history records 618 for respective users of the system. As will be described in more detail below, these search history records 618 can be used by the caching component to infer portions of the federated data model of particular interest to the user for the purposes of caching those portions of the model to the user's client device for local searching while the user's client device is offline from the search system 302.

In addition to processing search queries submitted by a user via a client device, some embodiments of the multi-platform industrial search system can also support automated dynamic searching. To this end, multi-platform industrial search system 302 may include a monitoring component 608 configured to monitor one or more performance or operational metrics of an industrial system to identify issues requiring attention by an operator or maintenance expert. In response to detection of a performance or operational issue, the monitoring component 608 can perform an automated search of federated data model 202 to collect search results relevant to the detected issue. A notification component 610 can then deliver a notification of the detected issue together with the relevant search results to one or more client devices associated with selected plant personnel determined to be best suited to address the issue.

In an example embodiment, monitoring component 608 may monitor selected data items of industrial system 614 according to defined monitoring rules. The monitoring rules can define, for example, which data tags of the various data platforms distributed across industrial system 614 are to be monitored, as well as criteria indicative of performance issues that, when determined to be true, will trigger an automated search and personnel notification. The monitoring rules can also define which employees are to be notified in response to each type of detected performance issue.

Figure 7:
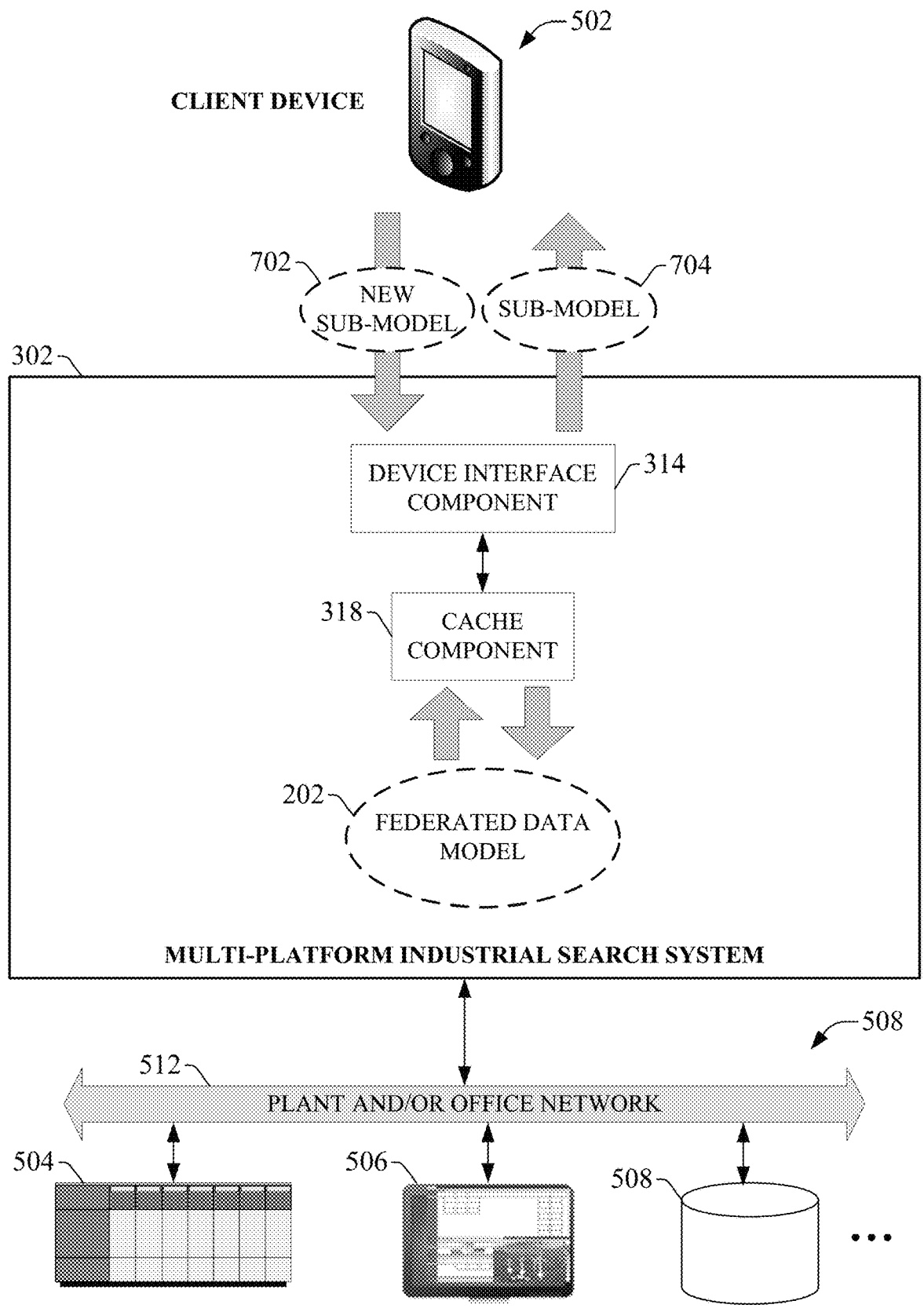
FIG. 7 is a block diagram illustrating caching of a model portion to client device.

As noted above, embodiments of the industrial search system can selectively cache portions of federated data model 202 to a user's client device 502, allowing the user to access the cached portions of the data model offline without requiring access to the search system 302. This can allow the user to submit searches to the cached portion of the model even at locations having limited or no access to external public networks through which the search system 302 would otherwise be accessed. FIG. 7 is a block diagram illustrating caching of a model portion to client device 502. As will be described in more detail herein, caching component 318 can select, for a given user, a portion of federated data model 202 determined to be relevant to the user based on analysis of various pieces of information. Information leveraged by the caching component 318 to determine or infer the relevant portion of data model 202 can include, but is not limited to, an identification of an industrial project associated with the user, a history of searches submitted to the federated data model 202 by the user, a role assigned to the user (which may dictate a set of machines or automation systems within the user's purview, as well as the scope of information that the user is permitted to access), a history of the user's location relative to one or more industrial automation systems, or other such information. Based on such information, the caching component 318 can retrieve the relevant portions of federated data model 202 and send the relevant portion as a sub-model 704 to the user's client device via device interface component 314. A client application executing on the client device can receive the sub-model 704 and cache the sub-model on the client device's local memory for offline use by the user.

The system can also support two-way data caching, whereby the user can submit a new or modified sub-model 702 to the search system 302 for integration with the federated data model 202. This functionality allows the user to collect information relating to an industrial automation system that may not be accessible by the search system's discovery component 304 (e.g., if the industrial automations system is located at a site that cannot be remotely accessed by the system 302), package the information as a new sub-model 702, and submit the new sub-model 702 to the search system (via device interface component 314) for integration with the federated data model 202, effectively updating the data model 202 to include information relating to the new industrial automation system. In another scenario, rather than generating a new sub-model, the client application can modify a previously cached sub-model 704 with updated information about the one or more industrial automation systems represented by the sub-model, and re-submit the modified sub-model to the system 302 for re-integration into the data model 202.

Figure 8:
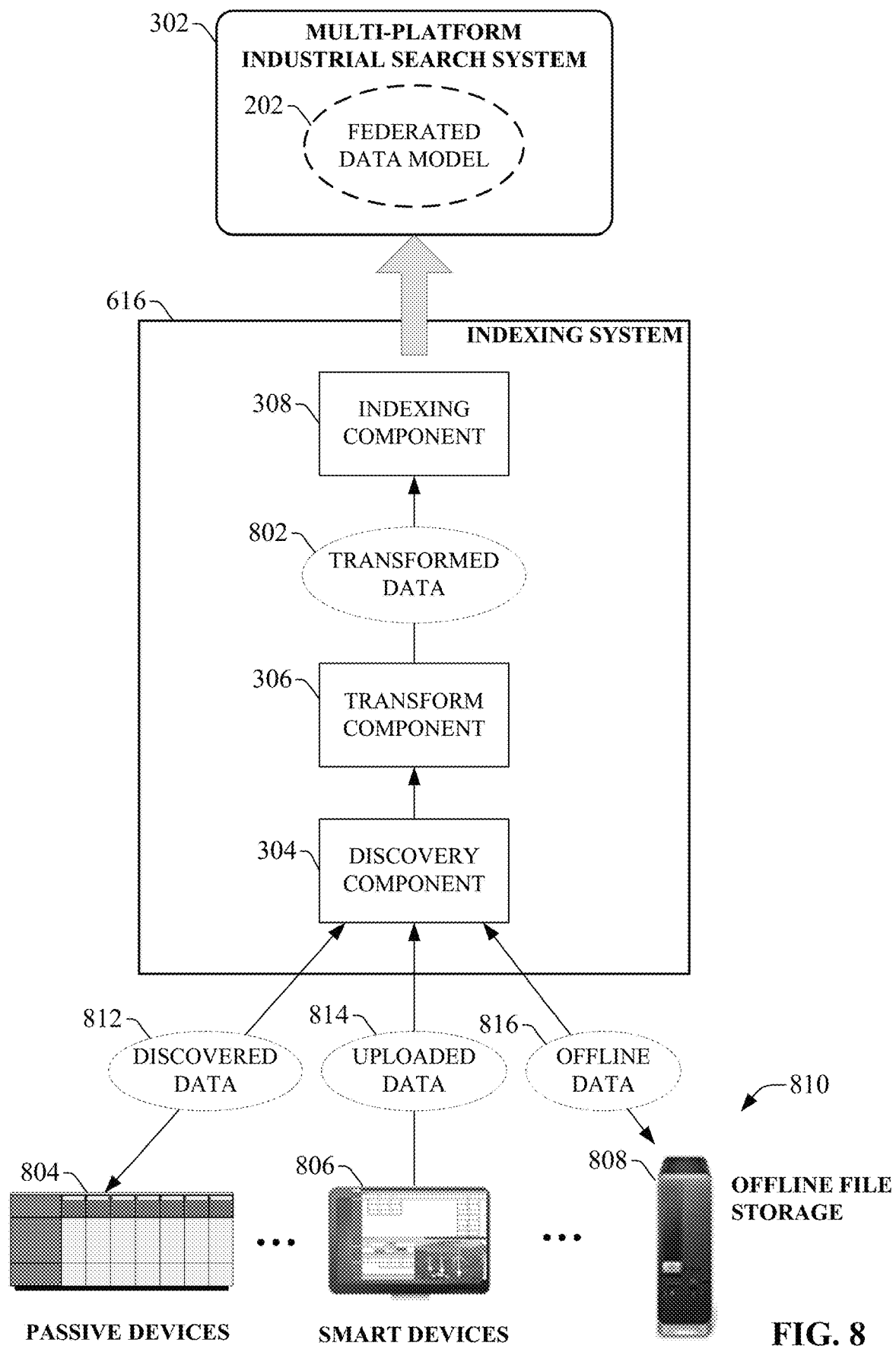
FIG. 8 is a block diagram that illustrates processing performed by an industrial data indexing system.

FIG. 8 is a block diagram that illustrates processing performed by the indexing system 616 of the industrial search system 302. A given industrial environment may comprise a diverse, heterogeneous set of data sources 810. In order to unify the data available on these sources under a common namespace for search purposes, the discovery component 304 can be configured to discover data in a number of ways. Some devices within the plant environment may be passive devices 804, which only provide information regarding their available data items in response to a request from the discovery component 304 of the indexing system 616. Such a request may be initiated by the discovery agent 518 (see FIG. 5).

In an example scenario, when the discovery agent 518 discovers a new data source during traversal of the plant network, the agent will examine the data source to identify the data items on that device that are eligible for indexing in the federated data model 202. If the discovered data source is an industrial controller, for example, the available data items may comprise data tags or registers defined by the industrial controller's configuration and programming file. The discovery agent can also identify how and where the data items are used in the industrial controller's program (e.g., ladder logic, sequential function chart, structured text, etc.) so that this information can be indexed as well. For example, upon discovery of the industrial controller on the plant network, the discovery agent 518 may subsequently identify a tag named Tank1 defined in the controller's program file, representing a particular tank of an industrial batch process. In response to discovering this tag, the discovery agent can scan the control program to identify the routines and program locations (e.g., ladder logic rungs) on which Tank1 is referenced. The discovery agent 518 can also identify how each instance of Tank1 is used at each program location (e.g., output coil, normally open contact, function block argument, etc.).

The discovery agent may additionally identify other data items defined in the industrial controller that have a functional relationship with Tank1. For example, upon identifying a reference to Tank1 on an output coil of a rung of the control program running on the industrial controller, the discovery agent 518 can then identify the other data values and statuses defined on that rung that control the state of the Tank1 output coil, and record this relationship between Tank1 and each of the other data values and statuses. In some embodiments, the discovery agent 518 can perform additional scans of the control program to determine additional data values and statuses that affect the states of each of the related data items, since those additional data values/statuses also affect the status of the Tank1 output coil. The discovery agent 518 may iteratively cycle through the control program multiple times in this fashion in order to discover all relevant data items having a functional relationship with Tank1.

In another example, the discovered data source may be an interface terminal executing an HMI application for visualizing a controlled process. In this scenario, the discovery agent may identify the terminal and proceed to scan the tag list defined in the HMI application to identify the data tags referenced by the HMI. These data items can include HMI tags linked to data tags of a networked industrial controller for display of associated controller data values or statuses on one or more of the HMI screens, or for writing values to the controller tags via an input object rendered on an HMI screen (e.g., a data entry field, a virtual push-button, etc.). For each discovered HMI tag, the discovery agent can identify the display screens on which the HMI tag is registered, as well as the external controller tags corresponding to the HMI tag. In some scenarios, the HMI tag may be identified by the same name as the corresponding controller tag (e.g., Tank1), although this may not always be the case.

The discovery agent 518 can package the information collected as described above—including an identity of the data source and its type (e.g., industrial controller, HMI, knowledgebase, device documentation, etc.), data items discovered on the data source, locations of the data items within an application running on the data source (e.g., routine and rung of a ladder logic program, HMI screen, etc.), correlations between the data items, etc.—and send this information back to the discovery component 304 as discovered data 812. Since the discovery agent 518 is capable of performing appropriate analysis on a number of different types of data platforms (e.g., industrial controller, HMI, device documentation, etc.) in order to identify the data platform and its available data, the discovery agent 518 may pre-format the discovered data 812 to conform a format compatible with the indexing system 616 prior to returning the discovered data 812 to the discovery component 304. In this way, the discovery component 304 and its associated discovery agent can automatically normalize heterogeneous data from diverse data formats into a common, homogeneous format that can be collectively processed and indexed by the indexing system.

Figure 9:
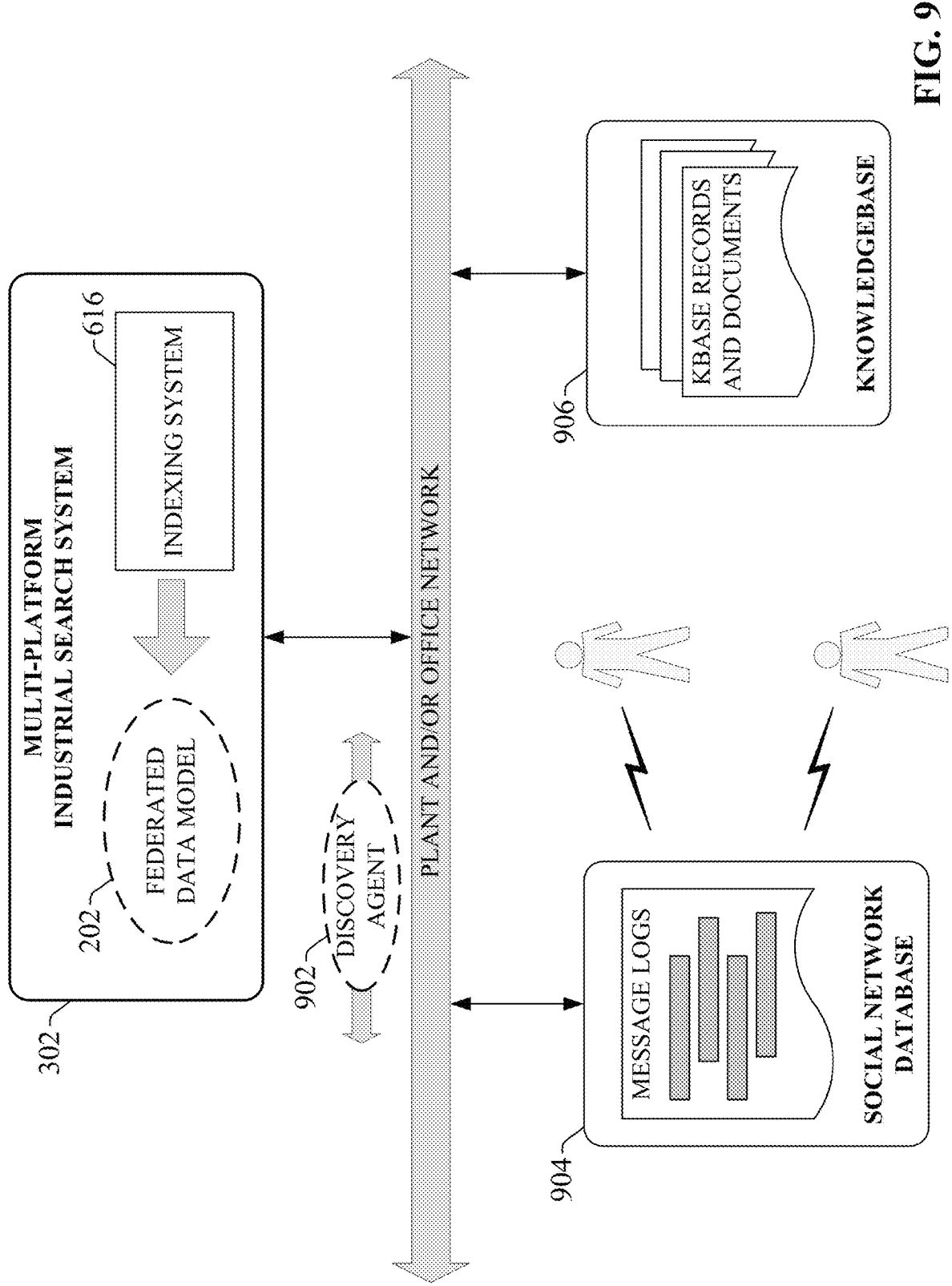
FIG. 9 is a diagram illustrating an architecture in which a discovery agent collects and indexing message log information.

In some embodiments, the discovery agent may also be configured to examine social networks used by plant employees in order to generate tags based on instant messaging discussions relating to a project or troubleshooting issue. FIG. 9 is a diagram illustrating an architecture in which discovery agent 902 collects and indexes message log information. In this example, a social network database 904 stores written communications between plant personnel. The written communications may comprise instant message logs, e-mail threads, text records, or other communication records. During data discovery, the discovery agent 902 can identify the social network database 904 and parse the stored message logs for keywords that may be used to associate the message logs with a particular work area, machine, process, or device. For example, the discovery agent 902 may determine, based on discovery of particular keywords within a message log, that a particular stored conversation was generated in connection with troubleshooting a particular machine or industrial device. Accordingly, the discovery agent 902 can report the presence of the message log to the discovery component with an instruction to tag the message log as being relevant to the machine or device. In this way, when a subsequent search is performed on the federated data model 202 for the machine or device, the message log will be returned as a relevant result. These logs may detail steps taken by maintenance personnel in connection with solving a particular issue with the machine or device, and are therefore flagged by the system as a relevant result when a search is performed on that machine or device.

In some embodiments, the discovery agent 902 may associate relevant supplemental information with a discovered message log based on keyword analysis of the log. For example, the customer may maintain a knowledgebase 906 on the plant or office network containing knowledgebase records and/or device documentation relating to particular devices or maintenance issues. Upon determining that a message log relates to a troubleshooting session for a particular machine or device, the discovery agent 902 (or discovery component 304) may generate an association between the log and a knowledgebase record or device document relating to that machine or device. Thus, when a search is subsequently performed for the machine or device, the search system can present a message log outlining steps taken in the past to address a maintenance issue pertaining to the machine/device, with links to relevant knowledgebase articles or device documents to provide supplemental information.

Figure 10:
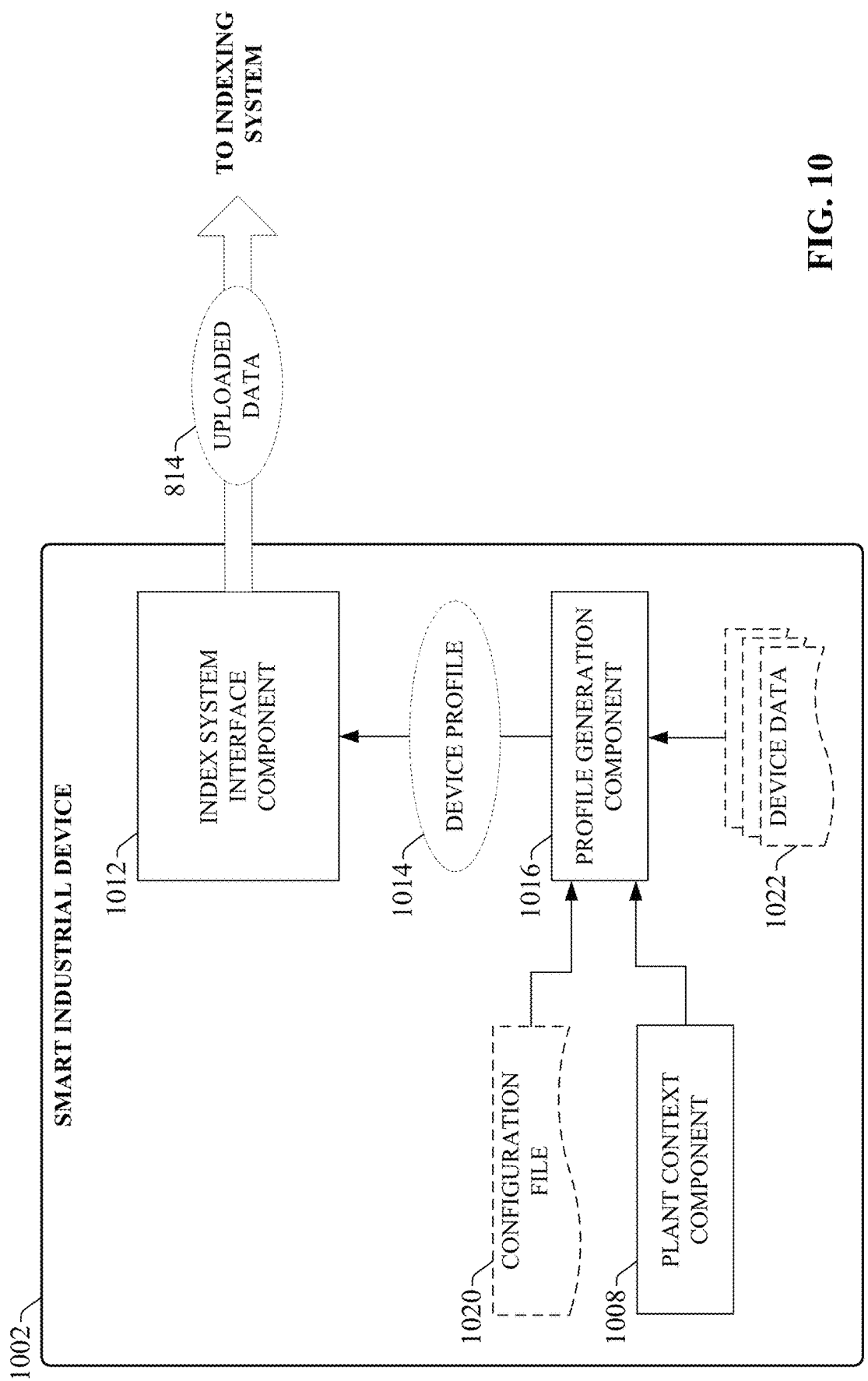
FIG. 10 is a diagram of an example smart device capable of self-reporting to an industrial data indexing system.

Returning now to FIG. 8, in addition to passive devices 804, the industrial environment may include one or more smart devices 806 having integrated self-reporting functionality. Such devices can provide uploaded data 814 regarding their identity and available data items to the indexing system 616 directly without the need for analysis by a discovery agent. Turning to FIG. 10, an example smart device capable of self-reporting to the indexing system 616 is illustrated. Smart device 1002—which may comprise substantially any type of industrial device or data storage unit (e.g., an industrial controller, an HMI terminal, a motor drive, device documentation storage, etc.)—includes an index system interface component 1012 configured to communicatively couple smart device 1002 to the indexing system 616 and exchange data therewith; e.g., via a plant network or over a public network such as the Internet (for configurations in which the indexing system resides on a web server or cloud platform).

When smart device 1002 is installed as part of an industrial automation system, index system interface component 1012 can establish communication with the indexing system 616. In one or more embodiments, the index system interface component 1012 can be configured to auto-discover the indexing system 616 on the common network. For example, the smart device 1002 may be pre-configured with the identification of the indexing system to which the device is to provide its identity and configuration information (e.g., a name associated with the indexing system, a machine identifier, a cloud or web address, etc.), or may be configured to perform a search of the plant network for compatible industrial indexing and search systems that may be present on the network. Any suitable handshaking protocol may be used to establish communication between the smart device 1002 and the indexing system.

Upon discovery of the search system, the smart device 1002 can package and send relevant information about the device and its available data to the indexing system, which integrates the reported data items in federated data model 202. In some embodiments, a profile generation component 1016 can generate a device profile 1014 for smart device 1002 to be sent to the indexing system 616 via index system interface component 1012. Device profile 1014 can convey information about smart device 1002, including but not limited to an identity and type of the device, device data 1022 available on the device, a context of the device within the industrial environment, any built-in displays or dialog screens (e.g., HTML pages) that provide access to the device's data, etc. In some embodiments, profile generation component 1016 may collect configuration information encoded in a configuration file 1020 stored on the smart device 1002, which may be a control program, a configuration or parameters settings file, an application file (e.g., an HMI application or HTML page), or other such file. The profile generation component 1016 can also identify available device data 1022 on the device (e.g., real-time or historical data tags, etc.). In some embodiments, the profile generation component 1016 can also identify relationships between the data items using techniques similar to those used by the discovery agent, including but not limited to the iterative relationship discovery process described above. The profile generation component 1016 can package this information into a device profile 1014, which is then sent to the indexing system as uploaded data 814 by index system interface component 1012.

Some embodiments of smart device 1002 may also include a plant context component 1008 configured to collect additional contextual information about the smart device 1002 for delivery to indexing system 616. Plant context component 1008 can determine a context of smart device 1002 within the plant or enterprise environment. For example, one or more embodiments of plant context component 1008 can identify other devices and systems within its local environment and make a determination regarding a location of smart device 1002 within a hierarchical plant context or device topology. Some embodiments of the federated data model may represent a given industrial enterprise in terms of multiple hierarchical levels and device hierarchies, where each level comprises units of the enterprise organized as instances of types and their properties. Plant context component 1008 can gather information that facilitates locating its associated smart device 1002 within an organizational or device hierarchy in a number of ways. In one example, plant context component 1008 can identify a topology of devices sharing a common network with smart device 1002 and interconnections between the devices. For example, if smart device 1002 is an industrial controller, plant context component 1008 can identify one or more discrete or analog I/O devices connected to the controller (e.g. based on a configuration file 1020 that defines the I/O module configurations for the controller). In addition, plant context component 1008 can identify other controllers on the network and their role within the overall industrial enterprise (e.g., the production areas, workcells, or processes associated with the respective controllers), or a type of machine to which smart device 1002 is connected (e.g., a palletizer, wrapper, conveyor, etc.). In some embodiments, plant context component 1008 can also determine an identity of a particular network (e.g., a network name) to which smart device 1002 is attached, as well as any security requirements associated with the network or device (e.g., necessary security certificates). This information can be leveraged (either by profile generation component 1016 or an external application) to determine the device's location and role within the industrial automation system, since some networks may be dedicated to a particular production area. For networks that use certificate-based security, some embodiments of plant context component 1008 can also interact with a Global Discovery Service (GDS) in order to determine a certificate authority and obtain the proper security credentials. In some implementations, the security credentials obtained by the device may be necessary to establish a secure interface between the device and the cloud platform before the device's information can be indexed.

By gathering information about the local device topology, plant context component 1008 can facilitate identifying a location of smart device 1002 within the enterprise hierarchy. In some embodiments, this determination of the location within the enterprise hierarchy can be made by plant context component 1008 itself. Alternatively, profile generation component 1016 can include information gathered by plant context component 1008 in device profile 1014 so that the indexing system 616 can accurately represent smart device 1002 within the enterprise or device hierarchy.

Some smart devices may also store pre-defined interface screens (e.g., HTML screens) used for device configuration or visualization of operational data. The indexing system can detect these screens (either using the discovery agent or based on information in the device profile 1014 provided by the device) and index these screens in the federated data model 202.

Returning to FIG. 8, the indexing system 616 may also collect and index offline data about certain industrial devices rather than gather information about the devices directly from the devices themselves. In this regard, some industrial devices may have information about their configuration, programming, and available data items captured and stored as offline files stored on separate offline file storage devices 808. Accordingly, one or more embodiments of the discovery agent 518 can identify and process these offline files in a similar manner as described above in order to index these devices in the federated data model.

Figure 11:
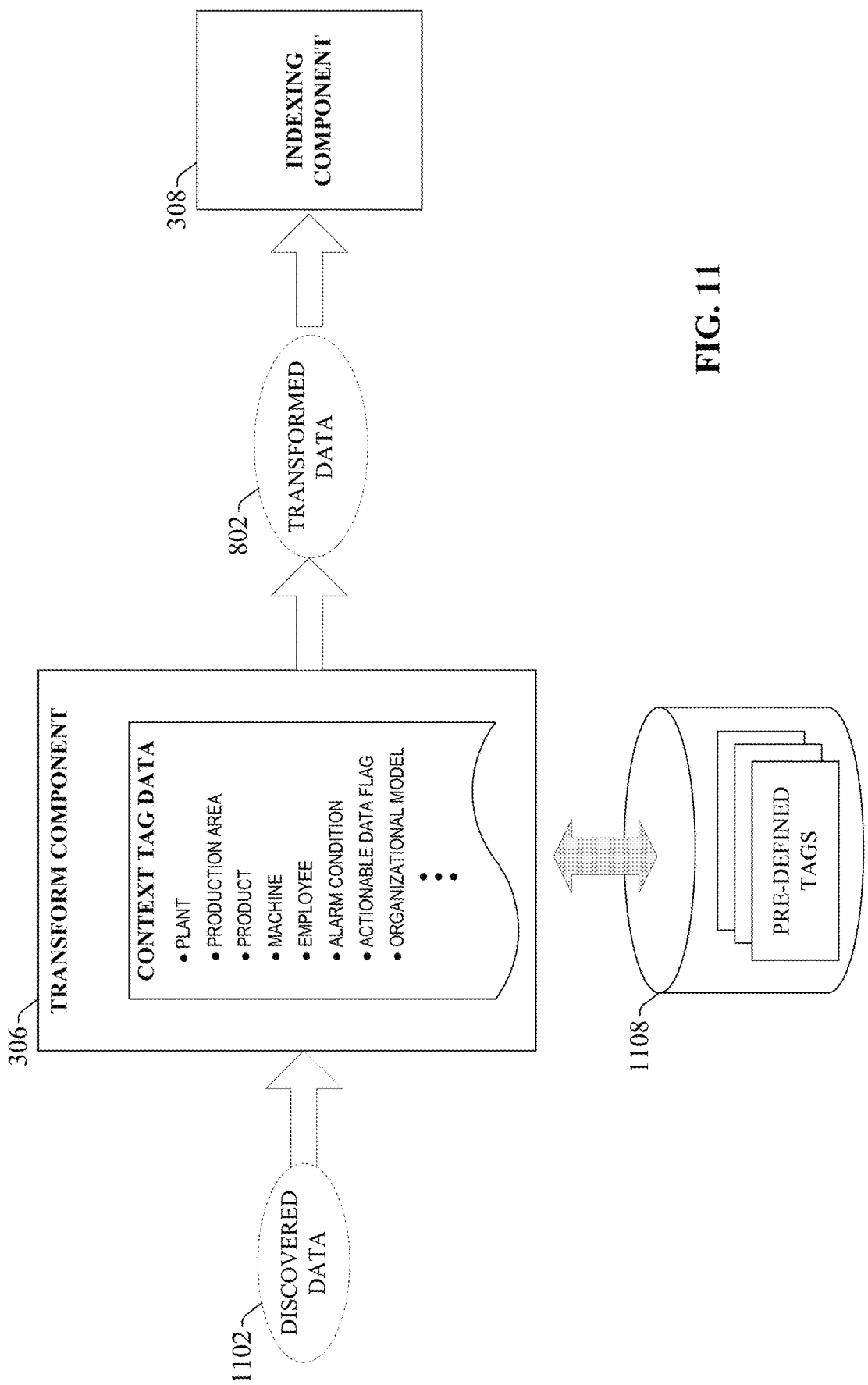
FIG. 11 is a diagram illustrating transformation of discovered data by a transform component.

Transform component 306 can perform any necessary transformation on the data collected by discovery component 304 prior to indexing. This can include, for example, normalizing any data that was not appropriately formatted by the discovery agent 518, so that all collected data accords to a common format usable by the indexing system 616. In some embodiments, transform component 306 can also add contextual data or tags to the collected data items to achieve highly granular indexing for search purposes, as well as to facilitate subsequent discovery of interdependencies between the diverse and plant-wide data items. FIG. 11 is a block diagram illustrating transformation of discovered data 1102 by transform component 306. As noted above, the discovery agent 518 (or discovery component 304) may add some contextual information to the discovered data items prior to sending the data to transform component 306. However, in some cases the transform component 306 may be able to add additional context to this data based on information not available to the discovery agent 518. In other scenarios, the discovery agent 518 may not have been able to contextualize all the discovered data due to limited available information about a given device (e.g., in the case of an older legacy device with limited capabilities).

Contextual data that can be added by transform component 306 for a given data item can include, but is not limited to, an identifier of a plant and/or production area at which the source of the data item resides; a machine or product to which the data item relates; one or more employees to be associated with the data item (e.g., based on the production area, shift during which the data item was collected, etc.); a concurrent alarm condition determined to be relevant to the discovered data item; an actionable data flag indicating that the value of the collected data item requires a response from plant personnel; or a tag indicating the location of the data time within the context of a hierarchical organizational model of the plant (e.g., in terms of an enterprise level, plant level, work area level, machine level, control level, etc.).

In some embodiments, the transform component 306 can selectively annotate discovered data items with one or more pre-defined tags 1108 or metadata defined in association with the indexing system 616. These tags may be used to contextualize the discovered data based on one or more user-defined tag categories based on tagging rules. For example, the user may define a tagging rule indicating that data collected from data sources within a particular workcell or machine of the plant are to be tagged with a pre-defined tag that associates the data items with a person, product, or other classifier for indexing and searching purposes. The tags 1108 allow the user to define relationships between sets of data that may not be automatically discoverable by the discovery component 304 and its associated discovery agents. In some embodiments, the indexing system may also be configured to maintain a user-defined system view that allows a user to selectively associate different devices under a combined unit of organization. This user-defined association can subsequently be used by the search system to ensure that all relevant devices are located in response to a search query. For example, when one device (and its associated data) is located within the logical hierarchy of the system defined by the federated data model in response to a search query, other devices having a user-defined association with the located device will also be identified and retrieved as a relevant search result. In some embodiments, these user-defined associations may also be made between selected data items stored on different devices (data-level associations), as well as between the device's themselves (device-level associations).

In some embodiments, the transform component 306 may also auto-generate tags for a given data item based on contextual information, including but not limited to rung comments associated with a controller tag, learned interdependencies between a newly discovered data item and a previously discovered data item (e.g., learn that Pump5 is associated with Tank1, and tag Pump5 as being associated with Tank1, or tag both Tank1 and Pump5 according to the larger system in which they operate), or other discovered contextual information. The indexing component 308 can associate similarly tagged data items in the federated data model 202 regardless of the platform in which they were discovered. For example, the indexing component 308 can associate common or related data items discovered, respectively, in an industrial controller, an HMI, and a data historian.

Figure 12:
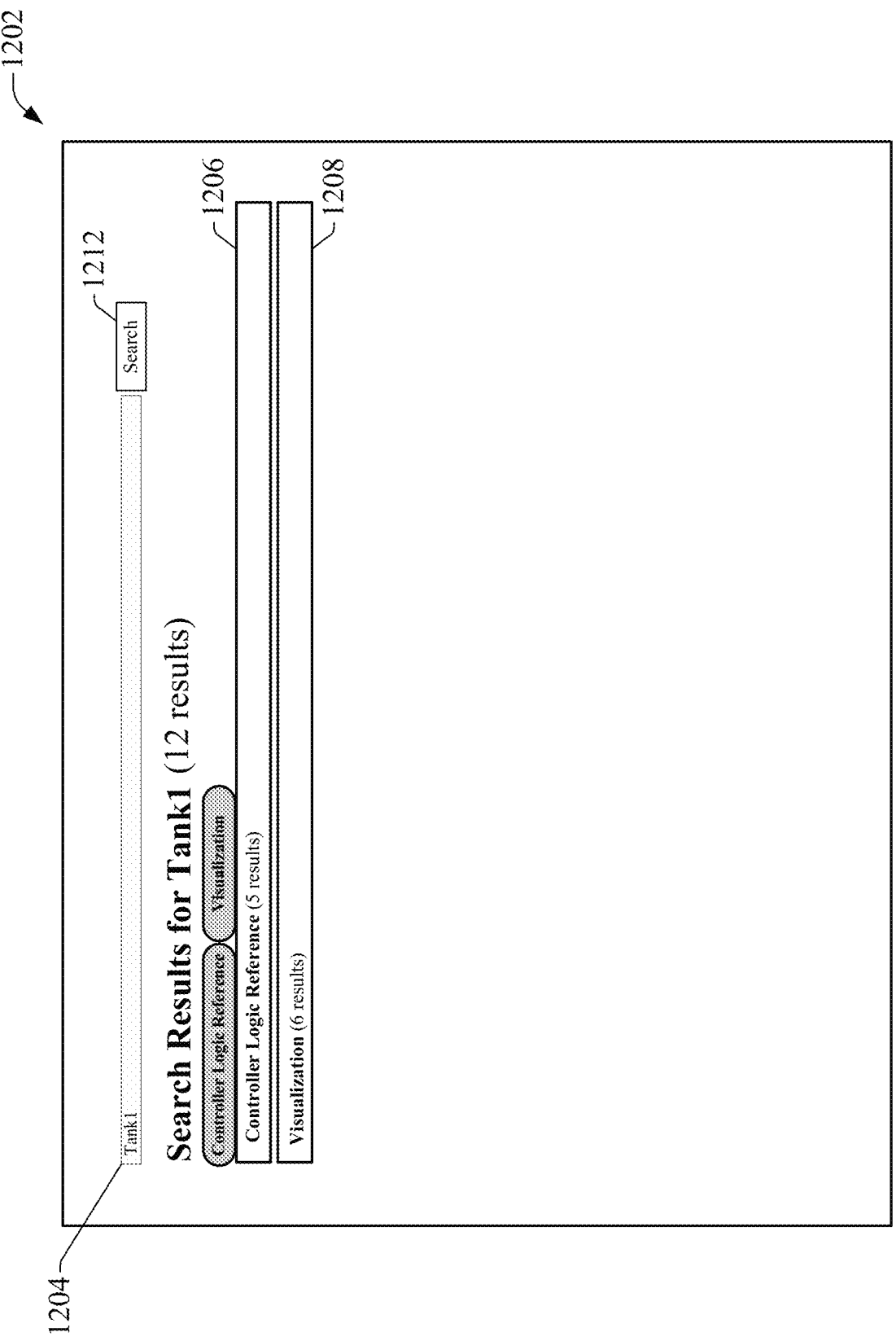
FIG. 12 is an example search result screen that can be delivered by multi-platform industrial search system.

Returning now to FIG. 8, the transform component 306 provides the transformed data 802 to indexing component 308, which indexes the discovered data and interdependencies therebetween in federated data model 202. The multi-platform industrial search system 302 can then be used to submit search queries to the federated data model 202, as described above in connection with FIG. 6. FIG. 12 illustrates an example search result screen 1202 that can be delivered by multi-platform industrial search system 302 is illustrated. In this example, a search for a tag named Tank1 has been submitted to the system. The search is initiated by entering the tag name in the search window 1204 and operating search button 1212. In response to the query, search component 310 identifies all instances of Tank1 recorded in federated data model 202, representing all known locations of or references to data items named Tank1 throughout the plant. In this example, 12 instances are discovered—five instances of Tank1 referenced within controller logic, and six references to Tank1 on one or more HMI applications (visualization platforms). These results are segregated between two collapsible result lists—a controller logic reference list and a visualization reference list.

Figure 13:
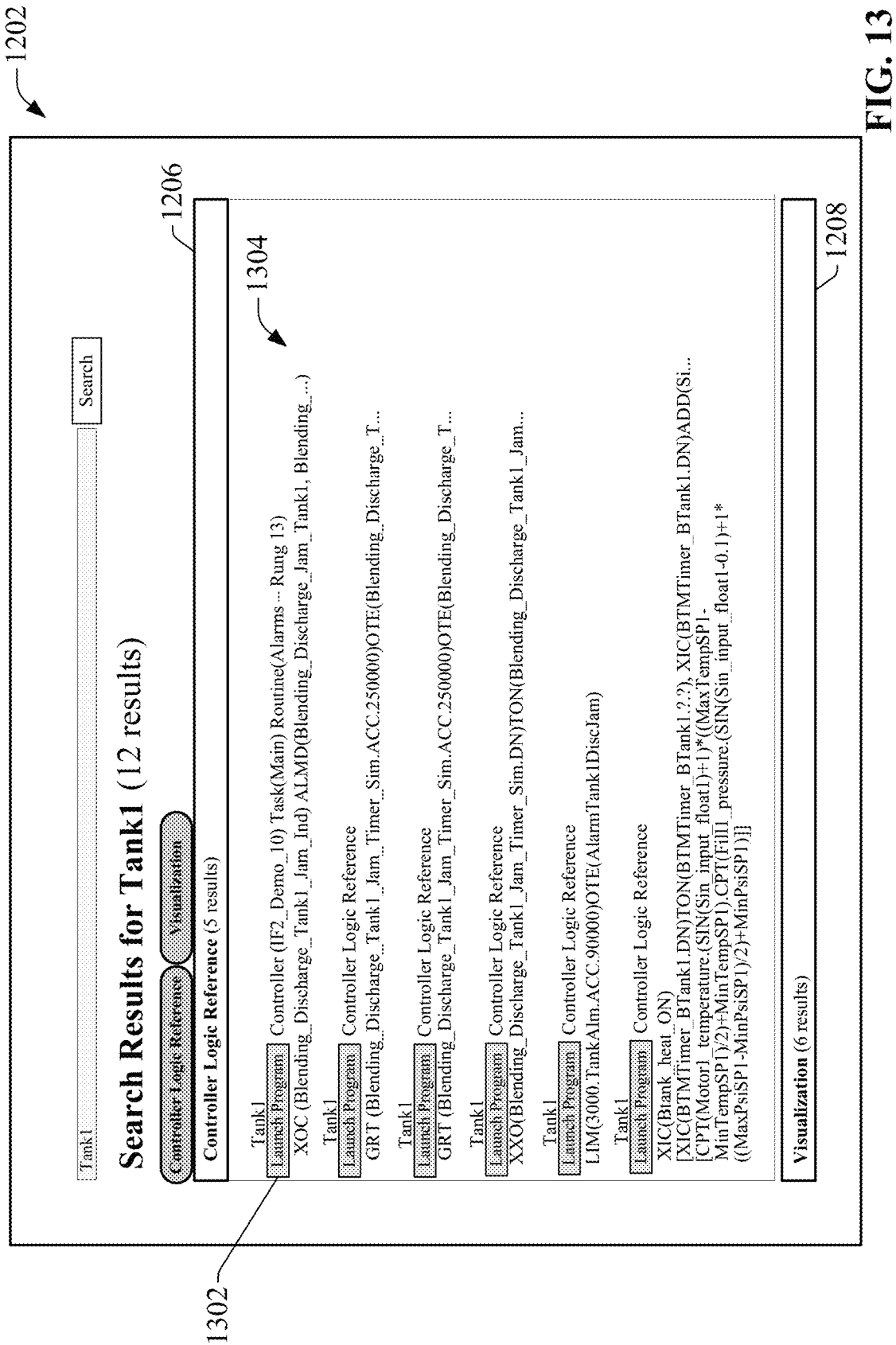
FIG. 13 is an example search result screen including an expanded list of controller logic reference results.

Selection of the controller logic reference list header 1206 expands and makes visible the list of controller logic reference results 1304, as shown in FIG. 13. Each item in the list of controller logic reference results 1304 identifies a control logic rung on which the Tank1 data tag is referenced. In this example, each result identifies the controller (e.g., IFT_Demo_10), routine (e.g., "Alarms"), and rung (e.g., "Rung 13") on which the tag is referenced. Each result also identifies additional context for the reference, such as type of logic element associated with the Tank1 reference (e.g., normally open contact, normally closed contact, output coil, GRT function block, etc.). In some embodiments, each item in the controller logic reference results 1304 may include an embedded image of the particular rung in its graphical form, including rung comments found in the source logic program to provide additional information and context about the result prior to user selection.

Figure 14:
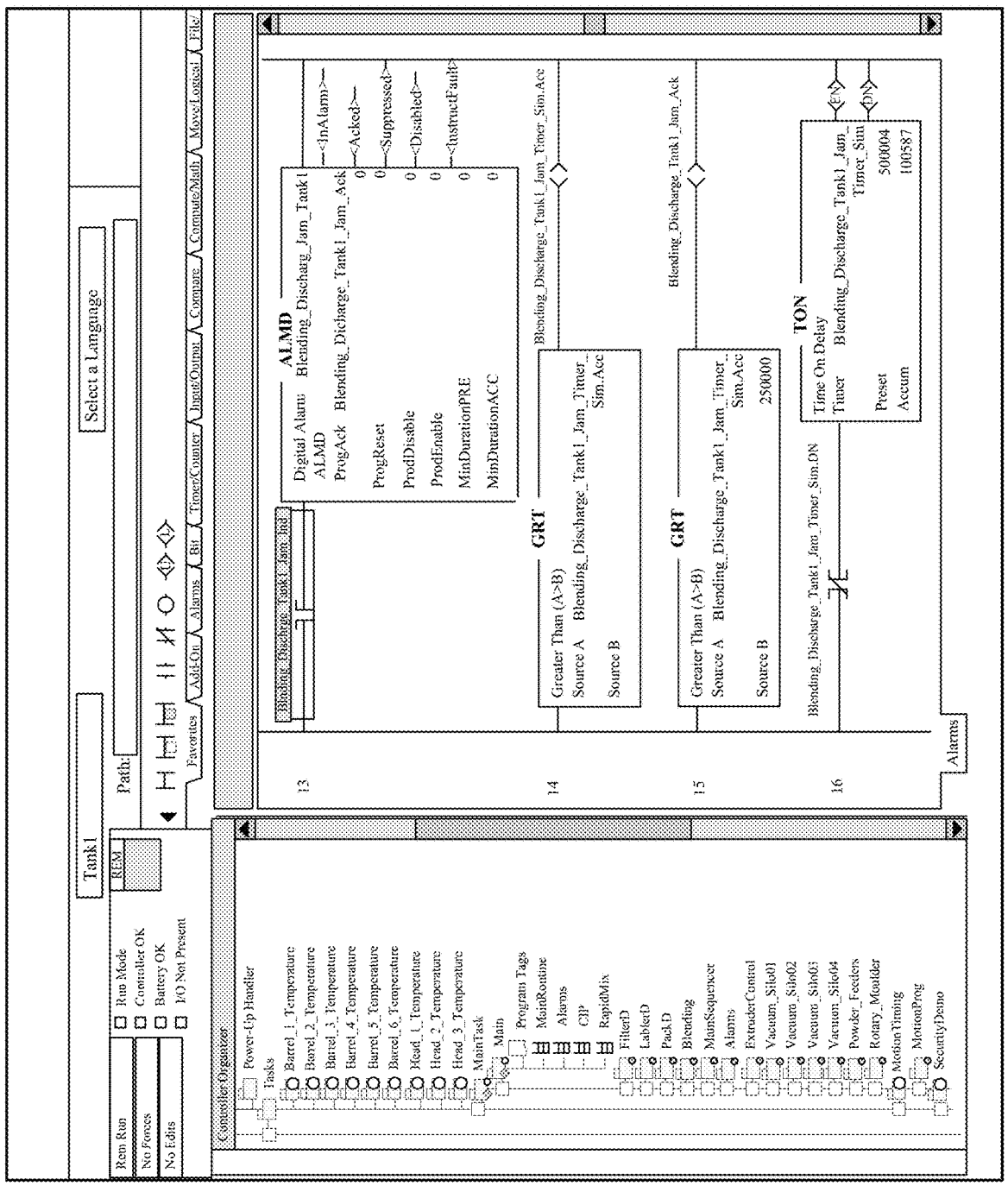
FIG. 14 is an example controller logic development screen launched by the industrial search system in response to selection of a "Launch Program" button corresponding to a controller logic reference result.

Each result also includes a "Launch Program" button 1302. Selection of a "Launch Program" button 1302 causes the search system's application launching component 316 to launch an appropriate program or application for viewing the selected result in context on the client device. In the present example, selection of a "Launch Program" button 1302 corresponding to one of the controller logic reference results causes the application launching component 316 to launch a controller logic viewing and/or development environment on the client device, as shown in FIG. 14. The search system also navigates to the location within the controller logic corresponding to the selected search result. That is, after launching the controller logic application 1402, the system navigates to the particular controller program, routine, and rung number corresponding to the selected instance of Tank1. The controller logic application 1402 provides a runtime view of the selected logic program on the client device, including live rung statuses and tag data values. In some embodiments, the live data for animating the runtime presentation of the controller logic can be routed to the client device by the search system 302. In such embodiments, the search system may establish a communicative link between the client device 502 and the selected industrial controller, allowing real-time data read from the controller's data table to be passed to the client device 502 to drive the runtime presentation of the controller logic.

Figure 15:
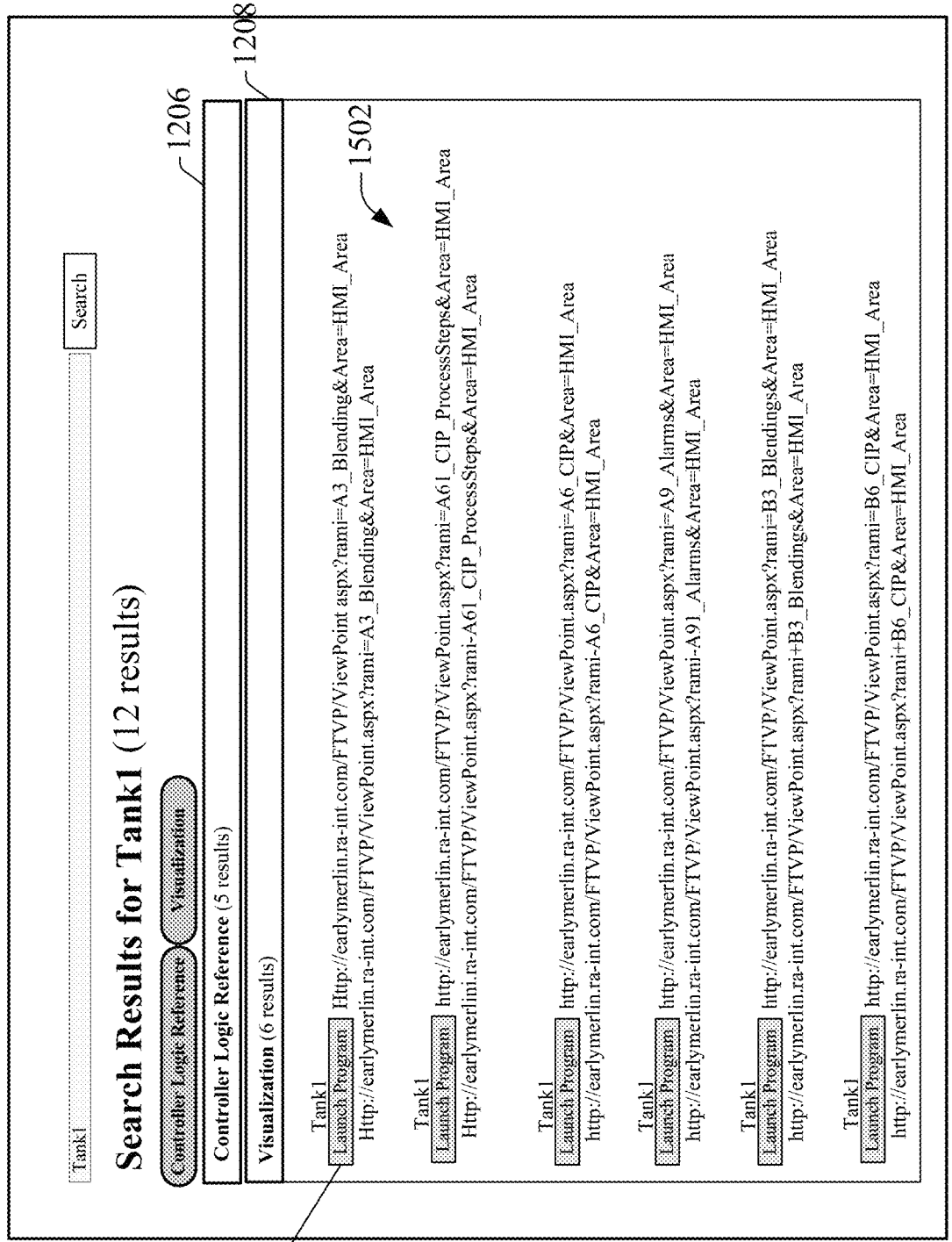
FIG. 15 is an example search result screen including an expanded list of visualization reference search results.
Figure 16:
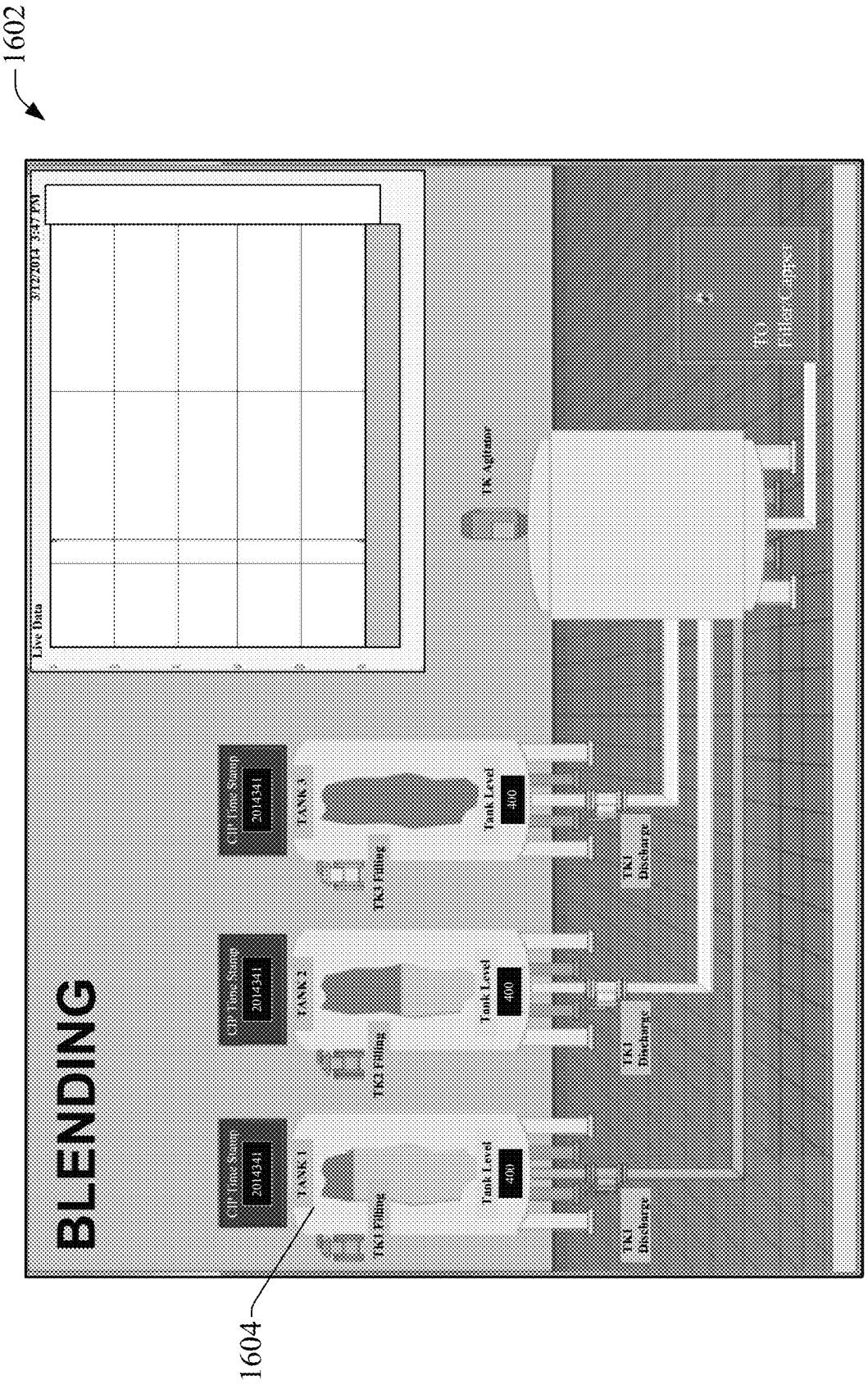
FIG. 16 is an example HMI screen invoked by selection of a "Launch Program" button associated with a visualization reference search result.

As shown in FIG. 15, selection of the visualization reference list header 1208 expands and makes visible the visualization result list 1502. Similar to the list of controller logic reference results 1304, each result in the visualization result list 1502 identifies the HMI location for the corresponding Tank1 reference. In particular, each result identifies the HMI application and interface screen on which the Tank1 data tag is referenced. In some embodiments, each item in the visualization result list may include a thumbnail image of the corresponding HMI screen to provide context. Selection of a "Launch Program" button 1504 next to one of the visualization reference results causes the search system to launch the appropriate visualization program on the client device for viewing the selected HMI display screen. FIG. 16 illustrates an example HMI screen 1602 invoked by selection of a "Launch Program" button 1504. In this example, HMI screen 1602 includes a graphic 1604 for Tank 1, which includes an animated tank level graphic, a numeric tank level indicator, and an animated discharge valve for the tank. As with the controller logic application described above, HMI screen 1602 provides a live runtime view of the process being visualized on the client device, where the animation and numeric displays are driven using real-time data retrieved by the search system and delivered to the client device. Launching of applications by the search system is discussed in more detail herein.

It is to be appreciated that additional platform-specific result categories not depicted in FIGS. 12-16 are also possible according to one or more embodiments. for example, as noted above, some device may include built-in web pages (e.g., HTML pages) used to view and/or modify device configuration, operational, or diagnostic information. These built-in device interfaces may be located and presented as another category of search results. Selection of the "Launch Program" button for one of these links would link the user to the appropriate built-in configuration page. In another example, device documentation may be presented as a category of results, wherein selection of one of these categories launches the appropriate document viewer for opening and displaying the selected document.

As noted above, one or more embodiments of the search system can also access off-premise data sources, including but not limited to web-based content (e.g., vendor knowledgebases or technical notes). Moreover, some embodiments of the search component 310 may be configured to correlate local search results (that is, search results located on data sources within the plant facility) with information available on web-based data sources. For example, if a local search result relates to a particular model of industrial device, the search component 310 may search external web-based data sources for additional information about that device (e.g., knowledgebase articles, on-line documentation, technical notes, information regarding the latest firmware revision for the device, etc.). The search component 310 can then present links to these external search results in association with the appropriate local search results.

In one or more embodiments, the search component 310 may also be configured to filter search results based on a current location of the client device 502 from which the search query was received. According to such embodiments, upon determining a set of search results in response to a search query, the search system may determine the location of the client device 502 (or the user of client device 502; e.g., using a location tracking badge carried by the user) and present only a subset of the total search results determined to be relevant to the user's present location. For example, if the user is determined to be located near a particular production line or within a particular workcell, the search component 306 may identify the subset of search results corresponding to industrial devices or machines located within that section of the plant facility.

To ensure that the federated data model 202 is kept current, the discovery component 304 can be configured to deploy one or more discovery agents periodically in order to identify newly added devices or newly available data items. In some embodiments, the discovery component 304 may be configured to deploy discovery agents in response to detection of a new device added to the plant network.

Figure 17A:
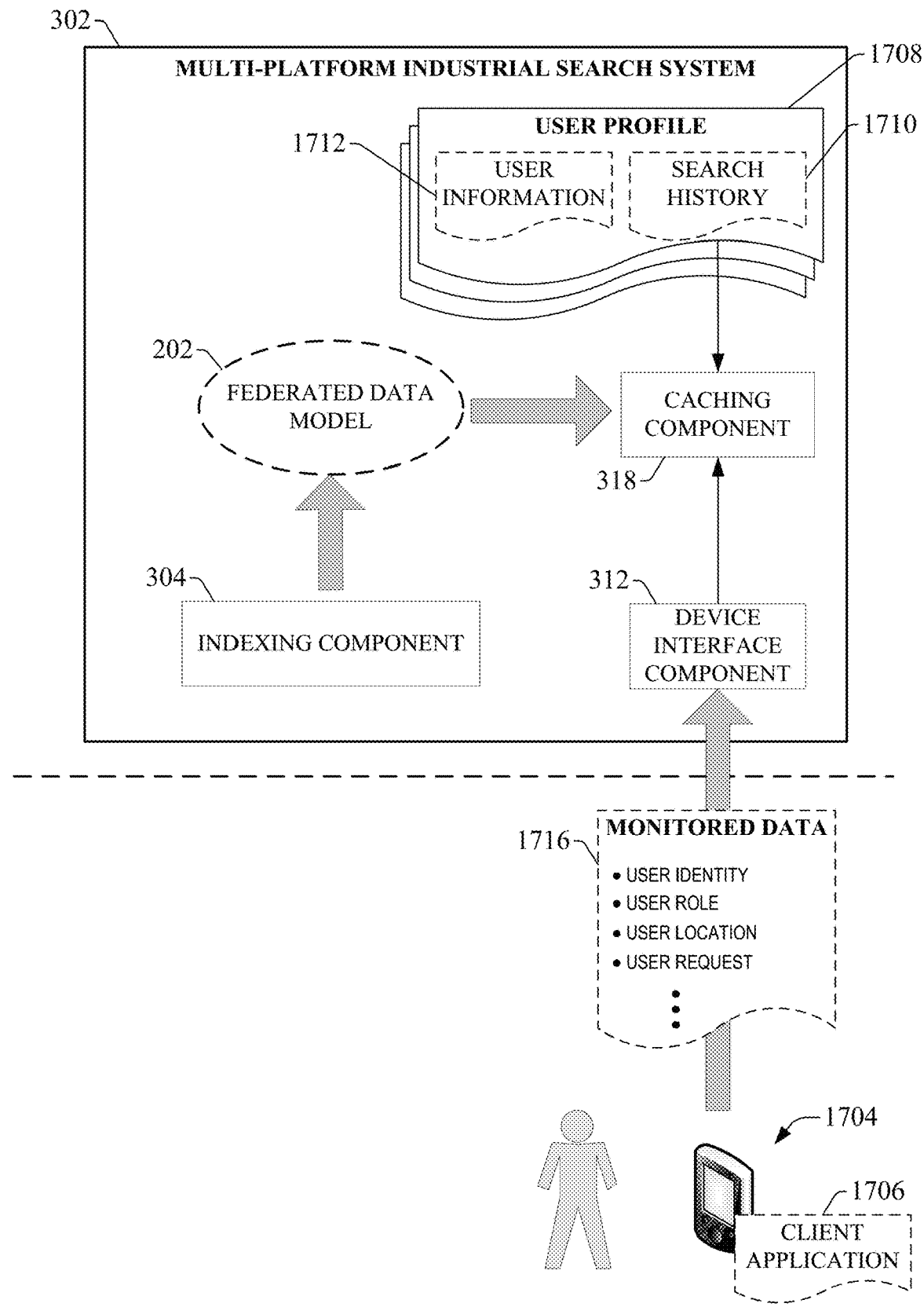
FIGS. 17A and 17B are block diagrams of a multi-platform industrial search system with local caching capabilities.
Figure 17B:
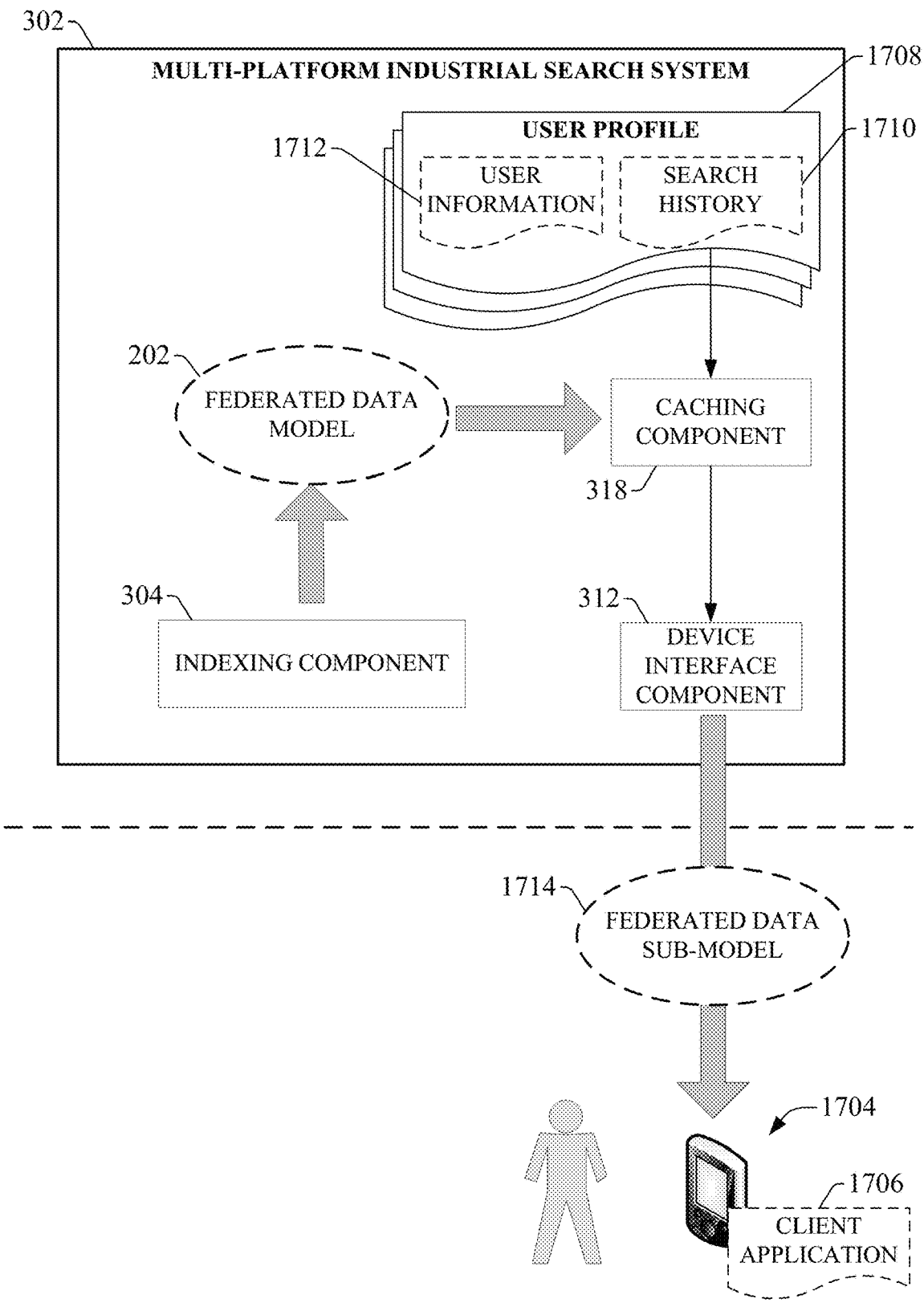

As noted above, in order to allow a user to perform searches against relevant portions of the data model 202 even when the user is at a location with limited or no wireless access to external networks (rendering the industrial search system 302 inaccessible to the user's client device), one or more embodiments of the search system 302 can include a caching component 318 that caches selected subsets of the data model 202 to the user's client device at selected times for the purpose of performing local searches. FIGS. 17A and 17B are block diagrams of a multi-platform industrial search system 302 with local caching capabilities. For a given registered user, caching component 318 can leverage various types of information to infer a relevant subset of the federated data model 202 that the user may wish to access while offline, as well as to determine a suitable time to send the selected subset of the model to the user's client device for local caching. To this end, the industrial search system 302 can maintain a number of user profiles 1708 corresponding to respective users of the search system. Each user profile 1708 can include user information 1712 specific to the corresponding user, including but not limited to a user identifier, a role of the user within the industrial enterprise (e.g., operator, maintenance technician, engineer, manager, etc.), an identity of one or more industrial automation systems or plant facilities with which the user is associated, or other such information. In addition, the user profile 1708 can also maintain search history information 1710 that records a history of searches submitted by the user to the federated data model 202. Search history information 1710 can be updated by the search component 310 in response to receipt of search queries submitted to system 302 by the user.

The caching component 318 can select relevant subsets of the federated data model 202 based on an amalgamation of these various items of information. For example, based on analysis of the search history information 1710 recorded for a given user, the caching component 318 may learn that a significant percentage of searches submitted by the user are directed to a particular industrial automation system at a plant facility. Accordingly, the caching component 318 can select portions of data model 202 corresponding to the identified automation system for local caching on the user's client device. The caching component 318 may further filter the selected portion of the model based on the user's role, as identified by the user information 1712. For example, a user having an operator role may only be permitted to view search results corresponding to HMI displays, while a maintenance technician or engineer may additionally be permitted to view industrial controller results. Accordingly, if the user is associated with an operator role (as defined by the user information 1712 of the user's profile 1708), the caching component 318 may filter the selected portion of data model 202 to only include model data that users having an operator role are permitted to access and view (e.g., HMI information). The caching component 318 can then send the resulting filtered portion of data model 202 as a federated data sub-model 1714 (see FIG. 17B) to the user's client device 1704 for local caching.

In some embodiments, the industrial search system 302 may also have explicit knowledge of an industrial project with which the user is currently involved, or one or more industrial systems that are of interest to the user. For example, the user may submit information to the system 302 identifying one or more industrial automation systems that the user wishes to be able to view regardless of the ability of the user's client device to access the search system 302. This system 302 can record the identified set of industrial automation systems in the user's profile 1708. As an alternative to explicit identification of one or more automation systems, the user profile 1708 may identify a plant facility or a work area within a plant facility associated with the user, and the caching component 318 can select portions of data model 202 that encompass the identified facility and/or work area. Based on these identified systems, facilities, or work areas, the caching component 318 will select the subsets of the data model 202 relating to those systems or areas for caching to the user's client device (as well as apply any appropriate role-based filtering, as described above). The caching component 318 will then send the selected subsets of the data model 202 to the user's client device as federated data sub-model 1714.

In addition to leveraging information stored in user profile 1708, caching component 318 can also analyze near real-time monitored data 1716 received from the user's client device 1704 in order to determine suitable subsets of the data model 202, as well as to determine suitable times at which to download the selected sub-model 1714 to the client device 1704. For example, client device 1704 may execute a client application 1706 that provides user-specific information to the industrial search system (via device interface component 314) on a real-time or near real-time bases. This monitored data 1716 can include, but is not limited to, the user's identity (which allows the caching component 318 to identify the appropriate user profile 1708 corresponding to the user), the user's role (if not already recorded in the user's profile 1708), or user's current location. In some embodiments, the search system 302 can track the user's location information and, based on this location history information, identify one or more automation systems or work areas that the user spends a significant percentage of time near. Any suitable criterion can be used by the system to flag a particular industrial system as being relevant to the user based on the user's location history, including but not limited to an identity of the automation system the user spends the most amount of time near relative to all automation systems within a facility, identification of multiple automation systems that the user spends more than a minimum defined duration of time near within a defined time period, or other such criteria. The caching component 318 can infer that the identified areas or automation systems are of particular interest to the user, and select portions of federated data model 202 corresponding to these areas or automation systems; e.g., based on a correlation of the monitored user location information with location information for the automation systems or plant facilities maintained in the federated data model 202.

In some embodiments, based on the monitored location information, the caching component 318 can also determine a location trajectory of the user, and infer an impending destination of the user based on an analysis of the trajectory. If the caching component 318 determines that the user's trajectory suggests that the user is in transit to a particular industrial site, work area, or automation system, the caching component 318 will select the portion of federated data model 202 corresponding to this destination and deliver the resulting federated data sub-model 1714 to the user's client device. This feature can be particularly useful in scenarios in which the user will be visiting an industrial site having limited or no Internet access (e.g., an oil rig, a mining location, etc.), and will therefore be unable to access the search system 302 after arrival. In such scenarios, the system 302 will proactively cache the relevant portion of data model 202 to the user's client device 1704 prior to the user's arrival at the remote site while the user's client device is still capable of remotely accessing search system 302, allowing the user to submit local searches to the cached sub-model while at the remote industrial site (e.g., using client application 1706).

Figure 18:
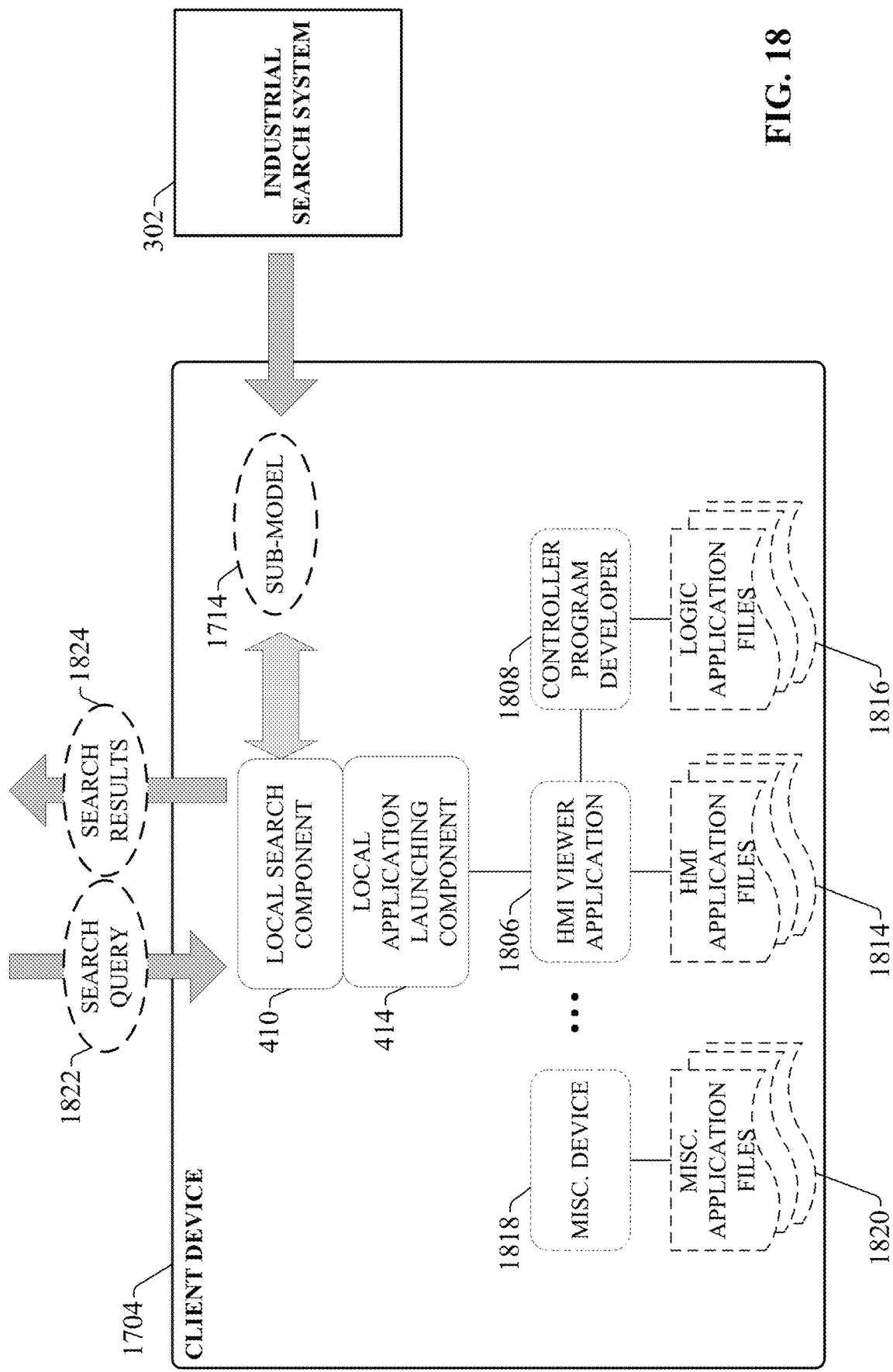
FIG. 18 is a block diagram illustrating local submission of search queries to a locally cached sub-model on a user's client device.

FIG. 18 is a block diagram illustrating local submission of search queries to a locally cached sub-model 1714 on the user's client device 1704. In general, search queries submitted to the sub-model are processed in a substantially similar way to queries submitted to the primary data model 202 maintained on the main search system 302, with the exception that processing of the queries is handled exclusively on the user's client device. In this example, client device 1704 is pre-installed with HMI viewer application 1806 and controller program developer 1808. Client device 1704 also stores application files for the HMI viewer application 1806 and controller program developer 1808 (other miscellaneous types of applications 1818 and associated application files 1820 may also be stored on client device 1704, including but not limited to camera viewing and configuration software, motor drive configuration software, instrumentation software, etc.). HMI application files 1814 may comprise, for example, different HMI applications corresponding to different industrial systems, machines, work areas, etc. Each HMI application file 1814 contains the display screen definitions, graphical layout definitions, animation configurations, etc. for a particular HMI application. Each HMI application file can be loaded on HMI viewer application 1806 locally at the client device 1704 to facilitate viewing the defined displays screens. Logic application files 1816 correspond to controller programs that have been downloaded to respective industrial controllers throughout the plant. Each logic application file can be loaded on controller program developer 1808 to facilitate viewing and editing of the loaded controller program.

Local search component 410 may be installed on client device 1704 as part of client application 1706, and is configured to process received search queries 1822 is a manner similar to search component 310 of main search system 302. However, rather than submitting the queries to federated data model 202 on main search system 302, local search component 410 submits the queries to sub-model 1714 in order to identify relevant results. Upon identifying relevant search results based on the query 1818, the client application can render search results 1824 in the form of a result screen similar to search result screen 1202 of FIG. 12. Similar to examples described above in connection with FIGS. 12-16, the user may select a particular search result to be viewed (e.g., by selecting a "Launch Application" control associated with the result), causing a launch request to be sent to local application launching component 414. In response to receiving the launch request, local application launching component 414 instructs the appropriate application (e.g., HMI viewer application 1806 or controller program developer 1808) to open the application file required to facilitate viewing the selected search result. The launch instruction can also cause the selected application to navigate to the appropriate HMI screen or logic rung corresponding to the selected search result.

Figure 19:
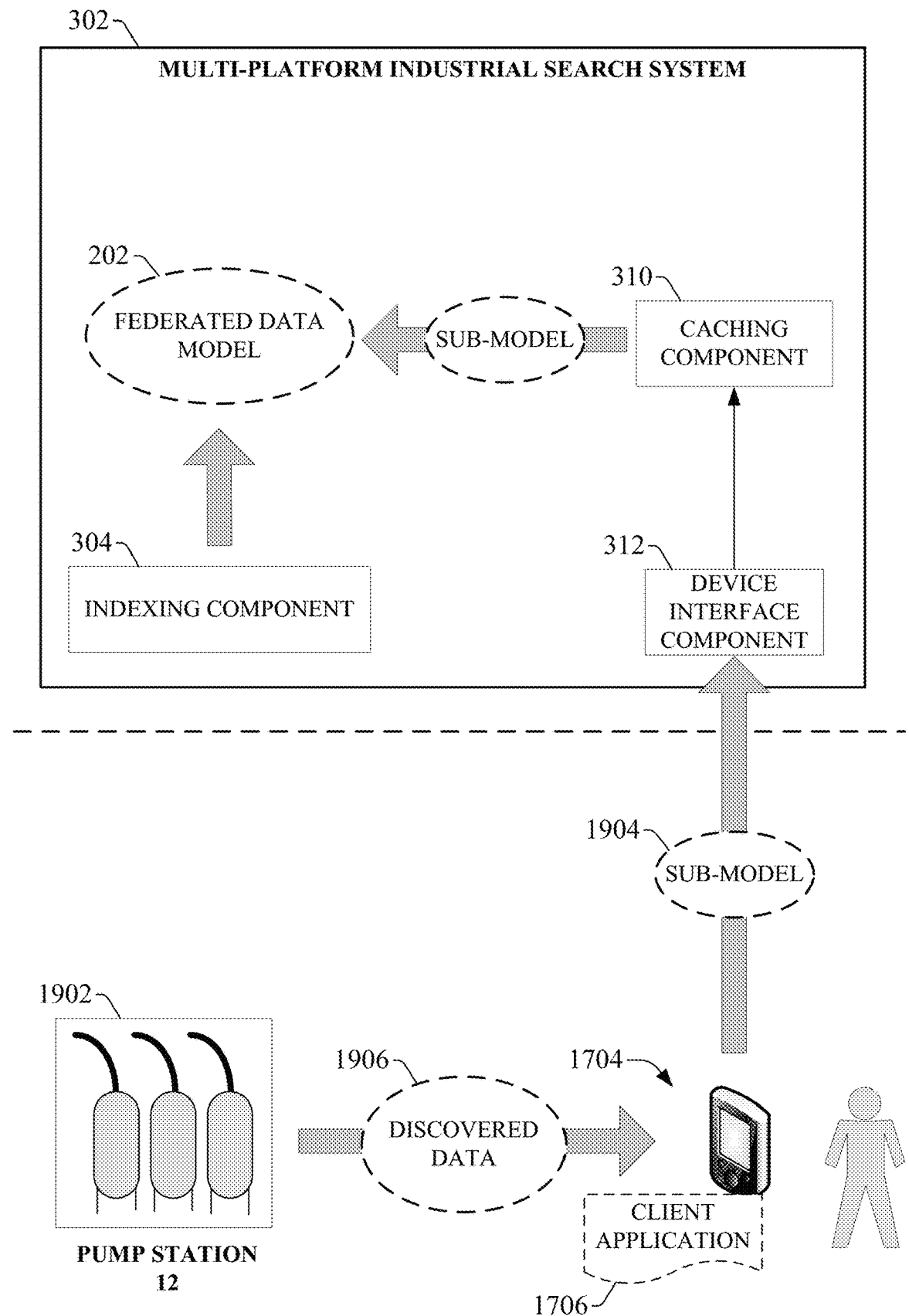
FIG. 19 is a diagram illustrating submission of a sub-model to an industrial search system by a user's client device.

As noted above, the architecture described above also allows a user to submit new or modified sub-models to the main search system for integration into the federated data model 202. FIG. 19 is a diagram illustrating submission of a sub-model to the search system 302 by a user's client device 1704. In this example, a user at an industrial facility collects information about an industrial automation system 1902 using data collection functionality of the user's client device 1704. To this end, client application 1706 executing on the client device 1704 may include a local discovery component 404, a local transform component 406, and a local indexing component 408 that perform functions similar to those of discovery component 304, transform component 306, and indexing component 308 of the main search system 302. For example, the local discovery component 404 can be configured to wirelessly interface with one or more industrial devices that make up industrial automation system 1902, and to obtain discovered data 1906 (similar to discovered data 812 described above in connection with FIG. 8) from those devices via the wireless interface for integration into a locally cached sub-model. Local transform component 406 performs a similar transformation on the locally obtained discovered data, and local indexing component 408 indexes the transformed data in the locally cached sub-model using techniques similar to those used by indexing component 308 to integrate transformed data into the main federated data model 202. The resulting sub-model 1904 comprises an index of data items available on the industrial devices, as well as any additional data about the devices (e.g., model, vendor, and/or other identifying information for the devices; nameplate information for the devices, etc.).

In some embodiments, the client application 1706 can also support collection of multimedia information via the client device's native multimedia recording capabilities, and transformation of this multimedia data into data that can be indexed in the cached sub-model 1904. For example, client device 1704 may be a wearable computer with which the user performs a visual or audio-visual scan of industrial automation system 1902. The visual scan can yield image or video data of the automation system, which can be analyzed by the client application to obtain information about the machines and/or devices that make up the automation system. In some embodiments, local transform component 406 can be configured to recognize nameplate information located on a particular motor or machine recorded in the video or image data; e.g., by first identifying the type of the machine based on its shape or other characteristic features, and then analyzing the location on the machine where the nameplate is expected to be located, where the expected nameplate location is based on the type of machine. Once the nameplate information is discovered in the image or video data, the local transform component 406 may perform optical character recognition or other suitable analysis to read and extract the information inscribed on the nameplate. The local transform component 406 can then generate a data tag identifying the machine or device that can be indexed in sub-model 1904. In some embodiments, the multimedia data itself can also be indexed in the sub-model, tagged with the identity information. Some embodiments of the transform component 406 may be configured to employ other methods of identifying machines and industrial devices—e.g., by recognizing other physical characteristics of the machines or devices—as an alternative to nameplate recognition. The resulting transformed data 802 comprising the machine identify information, and optionally the recorded multimedia information, can then be sent to the local indexing component 408, which indexes the multimedia file in the sub-model 1904. The local transform component 406 can also be configured to recognized functional relationships between the various devices and/or machines making up automation system 1902, and index these relationships in sub-model 1904 as well.

Processing of the discovered data and/or multimedia information collected by the client device and processed by the local client application components results in a new sub-model 1904 representing automation system 1902, which can be uploaded by client device 1704 (e.g., by cloud interface component 412) to the main search system 302. Once submitted, the caching component 318 can integrate the sub-model representing automation system 1902 to the federated data model 202, effectively updating the data model 202 to include the representation of the automation system 1902. In some embodiments, the client application 1706 can allow the user to input additional contextual information for the sub-model 1904 that can assist the caching component 318 to properly index the sub-model relative to other industrial systems already represented in the model 202. For example, the user may provide contextual information identifying a particular facility or work area in which automation system 1902 resides, a role of the automation system 1902 within the larger industrial enterprise, a relationship between automation system 1902 and another automation system already included in the data model 202 (e.g., an indication that automation system 1902 receives materials from another identified automation system, or that a product output of automation system 1902 is to be provided to another identified automation system), or other such information. The caching component 318 can leverage this additional contextual information to index the sub-model 1904 within the larger data model 202 in a manner that records the automation system's relationship with other automation systems within the enterprise.

At least some of this contextual information may also be collected automatically by the client device. For example, the client device may provide its current location information to the device interface component 314 together with the sub-model. The caching component 318 may use this location information to infer one or more of a plant facility, a work area, or an industrial automation system that the sub-model should be associated with in the federated data model, and index the sub-model accordingly.

The techniques described above can allow a user to gather information for an automation system that may not be directly accessible by the industrial search system 302 (e.g., due to a lack of Internet accessibility at the automation system's location) and to submit this information to the main search system 302 in a pre-packaged format capable of being integrated into the main data model 202. The sub-model 1904 can remain cached on the user's client device 1704 until the client device is at a location with sufficient internet connectivity to allow the sub-model to be sent to the search system 302 and synchronized with the data model 202.

As noted above, one or more embodiments of the multi-platform industrial search system 302 can be implemented on a cloud platform. The cloud platform can be any infrastructure that allows industrial search system 302 to be accessed and utilized by cloud-capable devices. The cloud platform can be a public cloud accessible via the Internet by devices having Internet connectivity and appropriate authorizations to utilize the industrial search system 302. In some scenarios, the cloud platform can be provided by a cloud provider as a platform-as-a-service (PaaS), and the industrial search system 302 can reside and execute on the cloud platform as a cloud-based service. In some such configurations, access to the cloud platform and the industrial search system 302 can be provided to customers as a subscription service by an owner of the industrial search system 302. Alternatively, the cloud platform can be a private or semi-private cloud operated internally by the enterprise, or a shared or corporate cloud environment. An example private cloud can comprise a set of servers hosting the industrial search system 302 and residing on a corporate network protected by a firewall.

If the cloud platform is a web-based cloud, industrial devices (or cloud agent devices acting as proxy devices) at the respective industrial facilities may interact with industrial search system 302 directly or via the Internet. In an example configuration, the industrial devices can connect to on-premise cloud agent devices through a physical or wireless local area network or radio link. In another example configuration, the industrial devices may access the cloud platform directly using integrated cloud agents.

Figure 20:
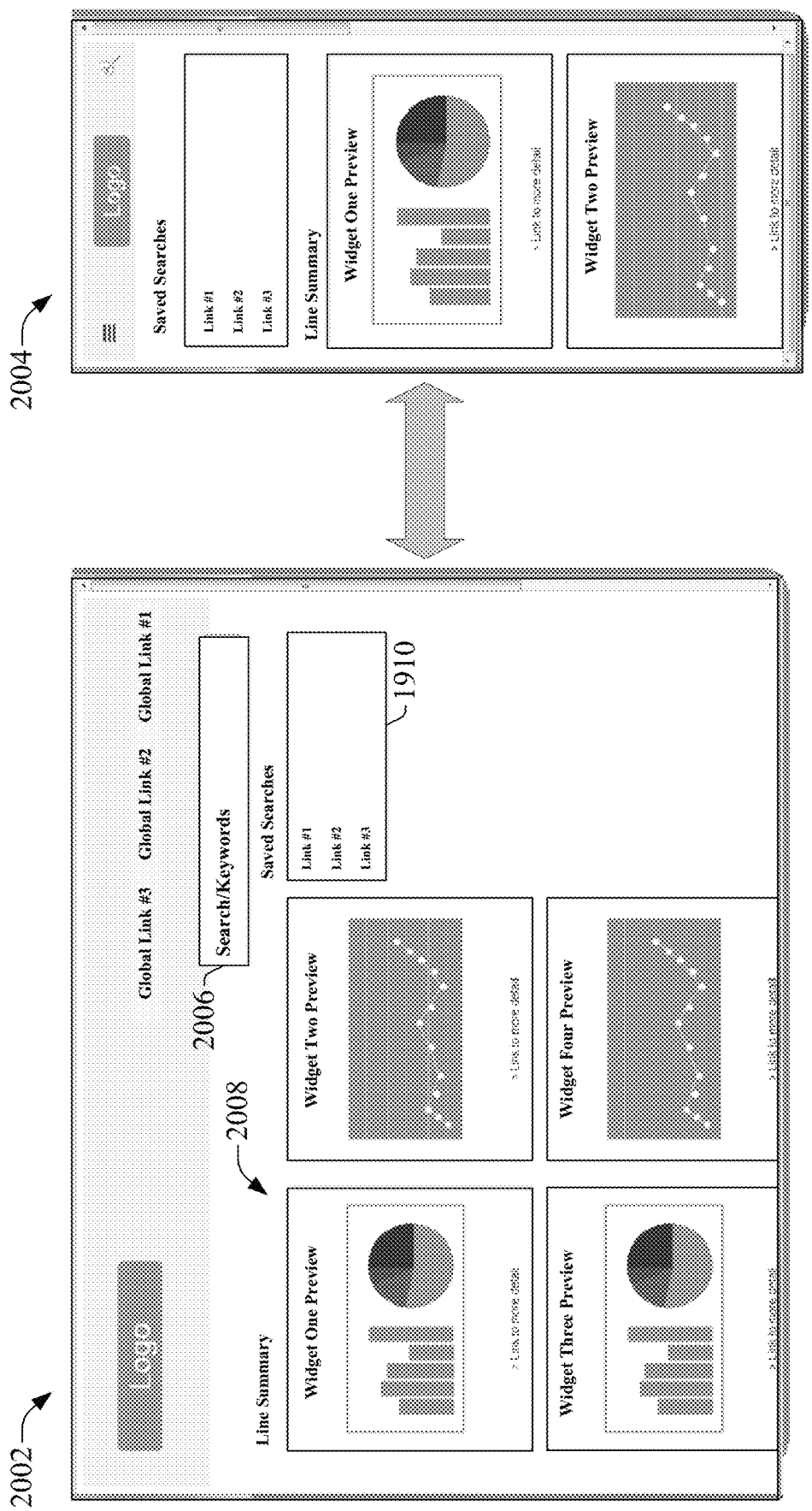
FIG. 20 is an example home interface screen that can be served to a client device by industrial search system.

In some embodiments, the industrial search system 302 allows users to customize the home screen delivered to their client device by device interface component 512. FIG. 20 is an example home interface screen 2002 that can be served to a client device by industrial search system 302. Home interface screen 2002 includes a search window 2006 for entering and submitting manual searches to the industrial search system. The system allows the user to save previously submitted searches in a "Saved Searches" list 2010, allowing the user to re-submit searches without the need to manually re-enter the search keywords in search window 2006. The user may also configure their home interface screen 2002 to display information summaries 2008 of selected aspects of their industrial systems. These summaries can be configured as alphanumeric data displays, graphical status indicators, bar graphs, pie charts, line graphs, or other suitable presentation format. In some embodiments, the home interface screen 2002 can also contain selected HMI screens or controller logic screens with active data animation. Since the industrial search system serves interface displays to disparate types of client devices having different sizes and display aspect ratios, the system can automatically scale and arrange screen content to fit the display parameters of the client device on which the screen is being displayed. For example, home interface screen 2002 may be suitable for display on a laptop or tablet computer. If the user invokes home interface screen on a mobile phone, the search system may deliver a reformatted display screen 2004, which conforms to the size and aspect ratio of that device.

When the user's client device is not able to connect to the main search system 302, necessitating redirection of search queries to the local search component 410 for submission to the cached sub-model 1714, a screen having a format to screens 2002 or 2004 can be generated by the local client application 1706 and used to submit queries via the local search component 410. In such scenarios, the screens can render a graphical or textual indication that the search system is currently operating in an offline mode, thereby informing the user that searches will be submitted to the cached sub-model rather than being routed to the main search system 302 for submission to the federated data model 202.

Figure 21:
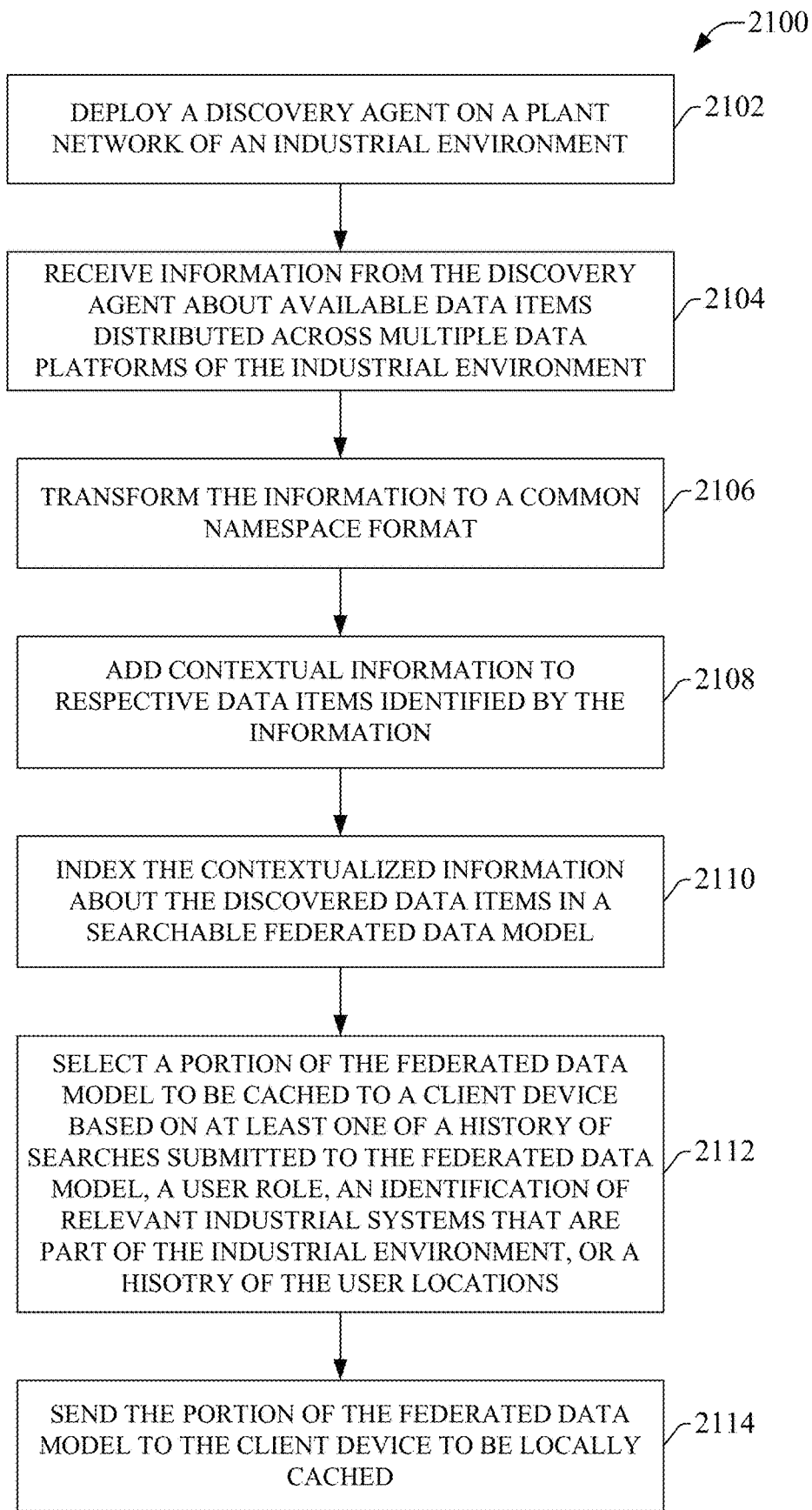
FIG. 21 is a flowchart of an example methodology for identifying and indexing multi-platform data in an industrial environment, and caching selected portions of the resulting data model to a local client device.
Figure 22:
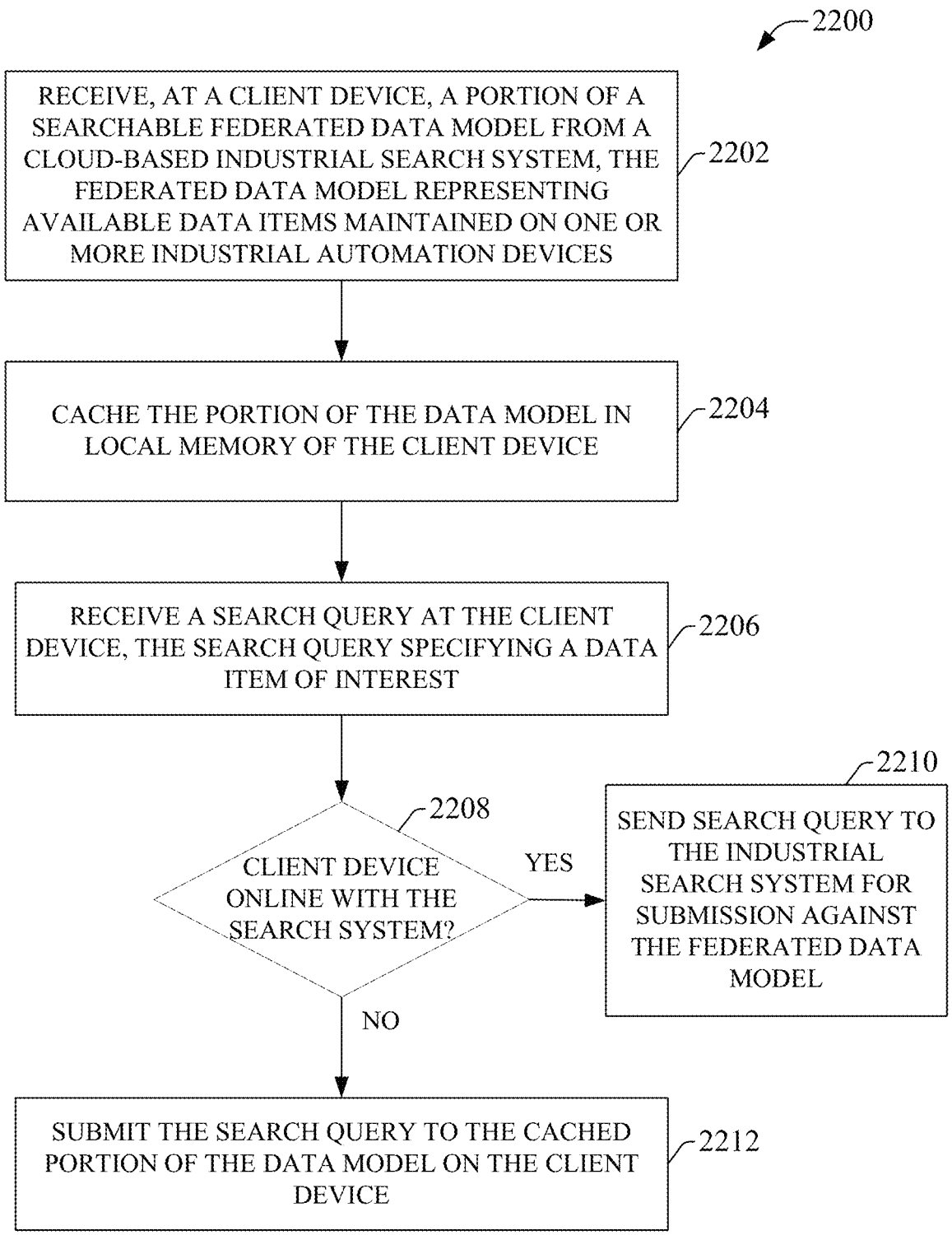
FIG. 22 is a flowchart of an example methodology for processing searches for industrial data received at a client device.
Figure 23:
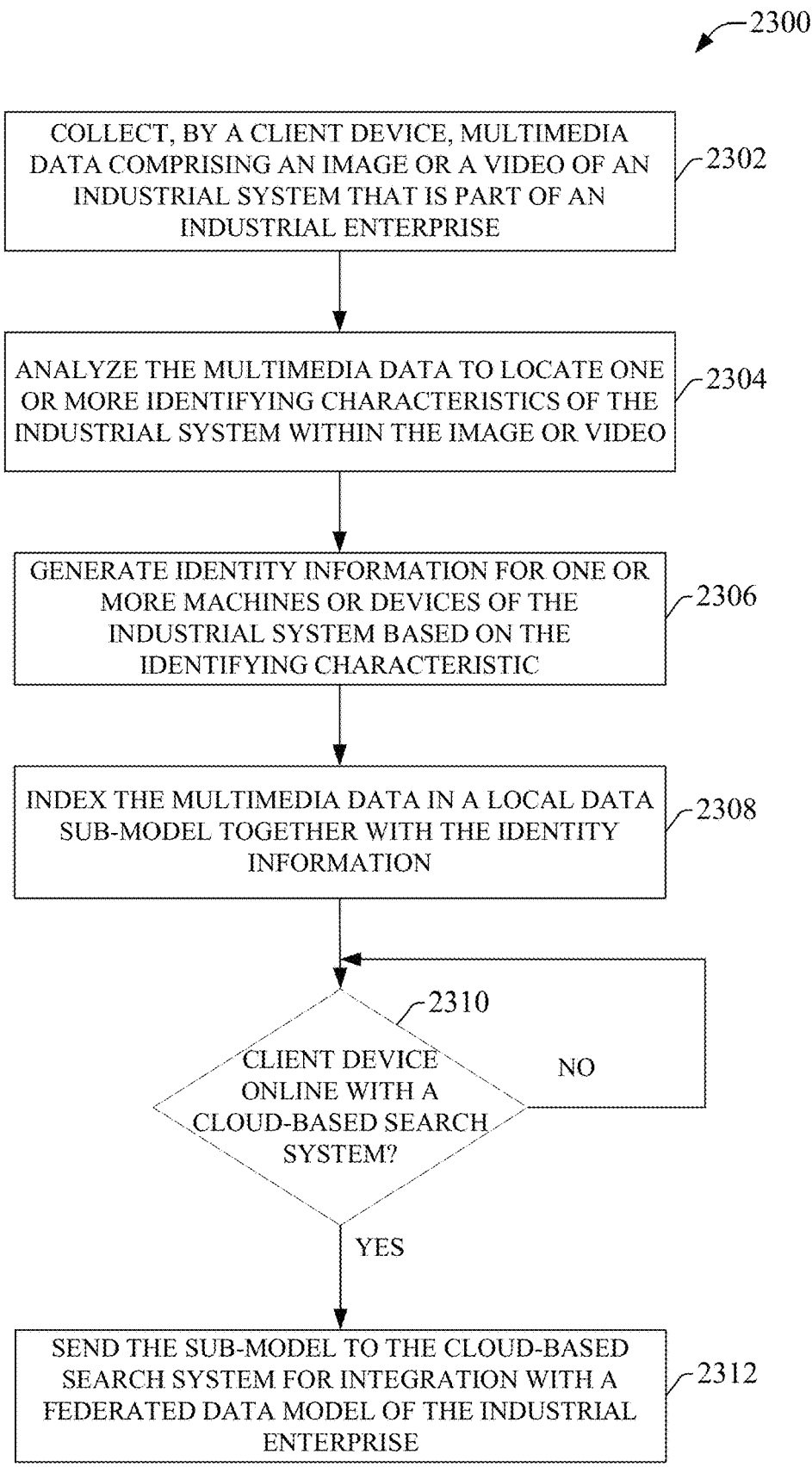
FIG. 23 is a flowchart of an example methodology for creating or updating a locally cached sub-model of an industrial automation system or machine and integrating the sub-model to a federated data model of a larger industrial enterprise.

FIGS. 21-23 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 21 illustrates an example methodology 2100 for identifying and indexing multi-platform data in an industrial environment, and caching selected portions of the resulting data model to a local client device. Initially, at 2102, a discovery agent is deployed on a plant network of an industrial environment. The discovery agent can be deployed, for example, by a discovery component of an industrial data indexing system that operates in conjunction with an industrial search system. The indexing and searching systems may be implemented as one or more stand-alone servers, one or more web servers, a cloud platform, or as another implementation. At 2104, information is received from the discovery agent about available data items distributed across multiple data platforms of the industrial environment. In some embodiments, the discovery agent can navigate the plant network and collect information regarding devices and systems in use (e.g., industrial controllers, HMIs, motor drives, documentation repositories, inventory tracking systems, etc.), and the available data associated with each device or system. The discovery agent can also identify correlations between data items across the various devices and data platforms (e.g., identifying that a data tag referenced on a particular rung of a control logic program is also referenced on a display screen of an HMI).

At 2106, the information received from the discovery agent is transformed to a common namespace format if the data was not already provided in this format. At 2108, contextual information is added to respective data items identified by the information. This contextual information may include, for example, a plant, production area, machine, or device on which the data was discovered; a relationship or interdependency between a given data item and another data item; a data platform corresponding to the data item (e.g., industrial control program, HMI application, knowledgebase article, device documentation, etc.), one or more employees having an association with the data items, or other such information. At 2110, the contextualized information about the discovered data items is indexed in a searchable federated data model.

At 2112, a portion of the federated data model created using steps 2102-2110 is selected to be cached to a client device based on at least one of a history of searches submitted to the federated data model, a user role, an identification of relevant industrial systems that are part of the industrial environment, or a location history of the user. For example, a profile associated with a particular user may record the history of searches submitted by the user to the federated data mode, and also identify the user's role within the industrial environment. The system can infer portions of the data model of particular interest to the user based on the history of searches (e.g., portions of the data model corresponding to particular industrial automation systems to which a significant percentage of the user's searches are directed), and may further filter these portions based on a scope of information permitted to the user's role. In another example, the user profile may explicitly specify one or more industrial systems within the industrial environment with which the user is associated, and the system may select portions of the data model corresponding to those industrial systems. At 2114, the portion of the federated data model selected at step 2112 is sent to the client device to be locally cached.

FIG. 22 illustrates an example methodology 2200 for processing searches for industrial data received at a client device. Initially, at 2202, a portion of a searchable federated data model is received at the client device from a cloud-based industrial data search system, the federated data model representing available data items maintained on one or more industrial automation devices. The data model can comprise an index of data items as well as the relationships between the data items. At 2204, the portion of the data model is cached in local memory of the client device. At 2206, a search query is received at the client device, the search query specifying a data item of interest. The search query can specify, for example, a particular data tag, a device name, a machine name, or other such search criterion.

At 2208, at determination is made as to whether the client device is currently online with the cloud-based industrial search system. If the client device is online with the search system (YES at step 2208), the methodology moves to step 2210, where the search query is sent to the industrial search system for submission against the federated data model. The federated data model can be searched to discover locations of the specified data item (and related data items) on at least two different data platforms within the plant environment. For example, based on a search of the federated data model, it may be discovered that the specified data item is referenced on one or more rungs of a controller logic program executing on an industrial controller (a first platform), as well as on one or more display screens of an HMI (a second platform).

Alternatively, if the client device is not online with the cloud-based industrial search system (NO at step 2208), the methodology moves to step 2212, where the search query is submitted to the cached portion of the data model on the client device, which is searched in a similar manner to the federated data model at step 2210.

FIG. 23 illustrates an example methodology 2300 for creating or updating a locally cached sub-model of an industrial automation system or machine and integrating the sub-model to a federated data model of a larger industrial enterprise. Initially, at 2302, multimedia data comprising an image or a video of an industrial automation system is collected by a client device. In one or more embodiments, the multimedia data can be collected by such client devices as a wearable computer, a portable camera or multipurpose personal device, or other such devices. At 2304, the multimedia data is analyzed to locate one or more identifying characteristics of the industrial system within the image or video. This analyzing step can be performed, for example, by a local transform component executing on the client device. In an example analysis, the local transform component may be configured to recognize presence of a nameplate on an industrial machine included in the industrial automation system and recorded in the image or video. In an example embodiment, the local transform component may identify the nameplate based on physical characteristics of the nameplate itself (e.g., the shape, dimensions, and/or color of the nameplate). Alternatively, the local transform component may first identify the type of the machine based on physical characteristics of the machine, then focus its analysis on an area of the machine at which the nameplate is expected to be located based on the determined type of machine. In yet another example, the local transform component may identify only physical characteristics of the machine itself as the identifying characteristics, without relying upon nameplate information.

At 2306, identity information for one or more industrial machines or devices is generated based on the identifying characteristics identified at step 2304. For embodiments in which the identifying characteristic comprises a nameplate mounted to the machine, the identity information may be generated by performing optical character recognition on the text printed on the nameplate in order to extract machine identification information from this nameplate information (e.g., a machine model number, vendor information, etc.). Alternatively, the system may be configured to recognize characteristic physical attributes of the machine itself, and to correlate these physical attributes with reference attributes corresponding to various machine models and vendors in order to select the machine identity that most closely matches the recognized physical characteristics. At 2308, the multimedia data received at step 2302 is indexed in a local data sub-model cached on the client device together with the identity information generated at step 2306.

At 2310, a determination is made regarding whether the client device is online with a cloud-based industrial search system. If the client device is not online with the search system (NO at step 2310), the methodology waits until the client device is online. When it is determined that the client device is online with the industrial search system (YES at step 2310), the sub-model is sent to the search system for integration with a federated data model of the industrial enterprise. The data model can represent a common namespace in which multiplatform data from a variety of data sources across an industrial enterprise is indexed for search and diagnostic purposes. The system may index the multimedia data in this data model for a variety of purposes. For example, the system may use the multimedia data as a visual reference that can be delivered to a user's client device when the corresponding industrial machine is invoked. The multimedia data may also serve as a reference image or video indicating either normal operation of the associated machine or an abnormal operation. Moreover, the identity information identifying the devices or machines that make up the automation system can be recorded in the data model as inventory information. The data model can also record geographical and/or functional relationships between the devices and/or machines making up the automation system.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 24:
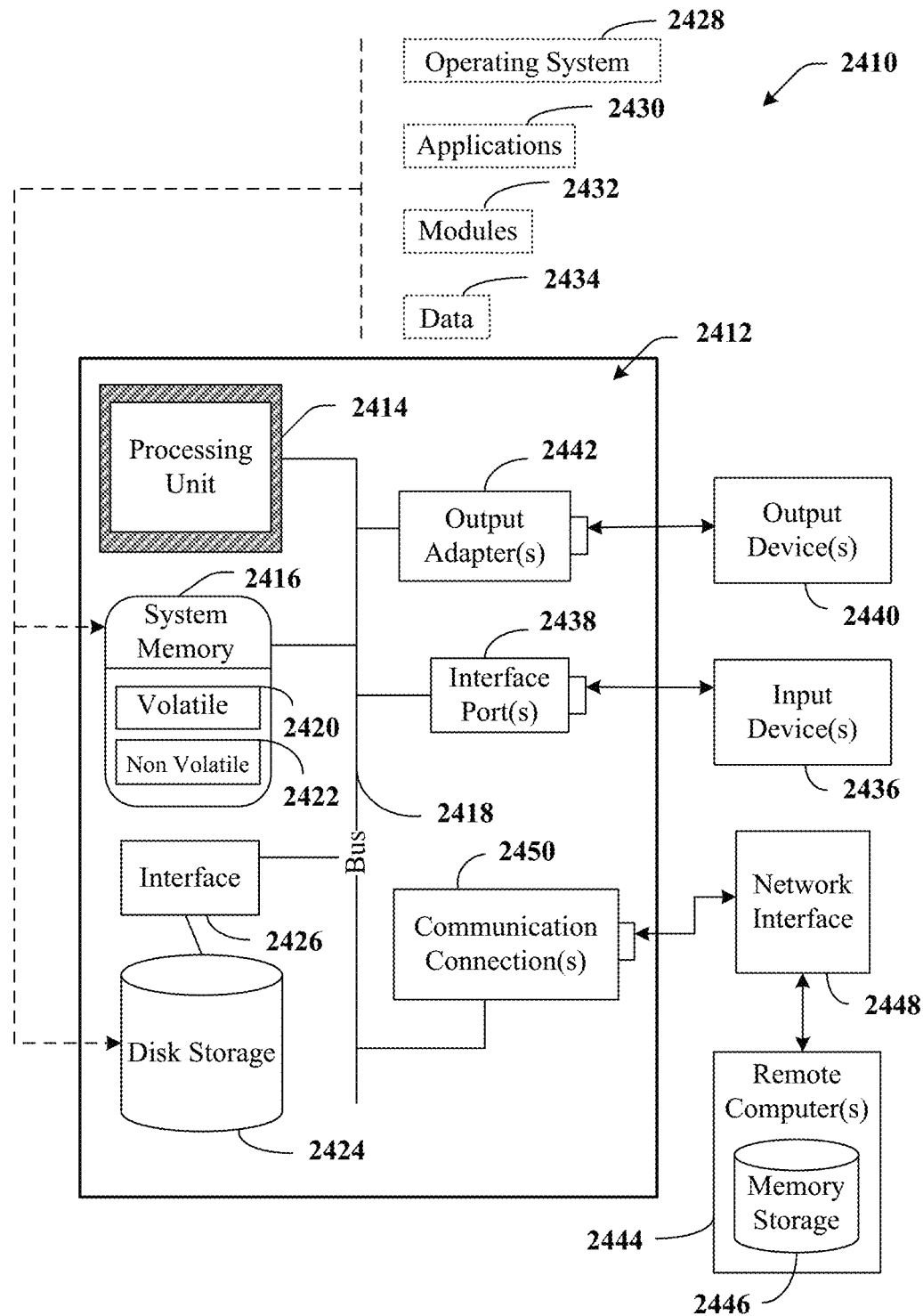
FIG. 24 is an example computing environment.
Figure 25:
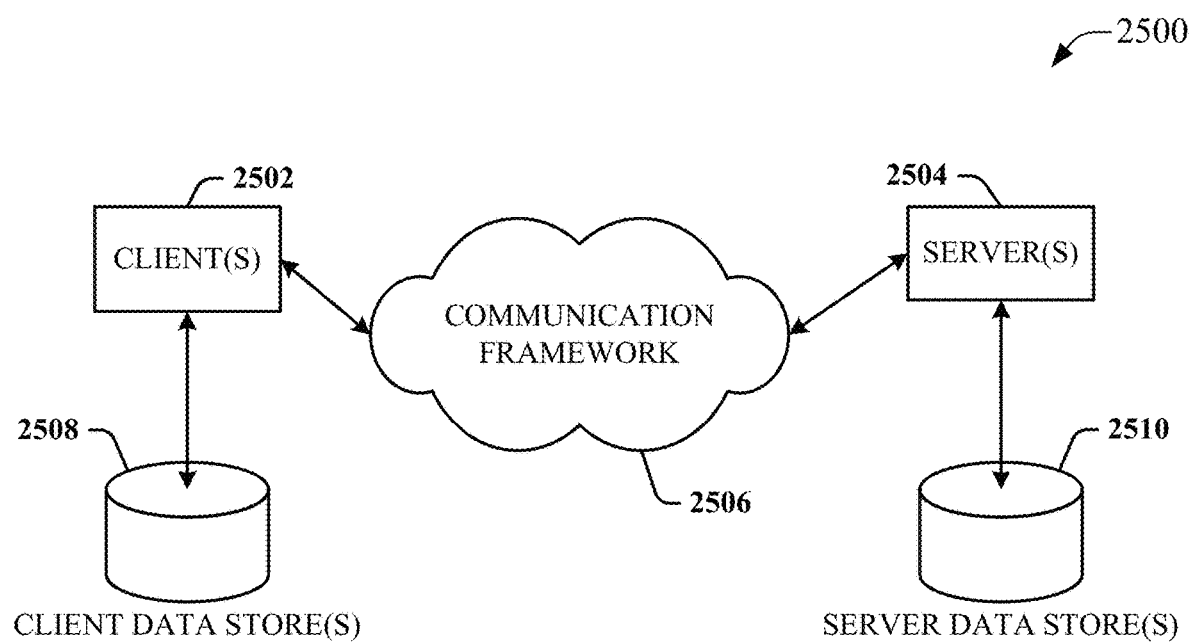
FIG. 25 is an example networking environment.

In order to provide a context for the various aspects of the disclosed subject matter, FIGS. 24 and 25 as well as the following discussion are intended to provide a brief, general description of a suitable environment in which the various aspects of the disclosed subject matter may be implemented.

With reference to FIG. 24, an example environment 2410 for implementing various aspects of the aforementioned subject matter includes a computer 2412. The computer 2412 includes a processing unit 2414, a system memory 2416, and a system bus 2418. The system bus 2418 couples system components including, but not limited to, the system memory 2416 to the processing unit 2414. The processing unit 2414 can be any of various available processors. Multi-core microprocessors and other multiprocessor architectures also can be employed as the processing unit 2414.

The system bus 2418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2416 includes volatile memory 2420 and nonvolatile memory 2422. The basic input/output system (BIOS), containing the basic routines to transfer information between elements within the computer 2412, such as during start-up, is stored in nonvolatile memory 2422. By way of illustration, and not limitation, nonvolatile memory 2422 can include read only memory (ROM), programmable ROM (PROM), electrically programmable ROM (EPROM), electrically erasable PROM (EEPROM), or flash memory. Volatile memory 2420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2412 also includes removable/non-removable, volatile/non-volatile computer storage media. FIG. 24 illustrates, for example a disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2424 to the system bus 2418, a removable or non-removable interface is typically used such as interface 2426.

It is to be appreciated that FIG. 24 describes software that acts as an intermediary between users and the basic computer resources described in suitable operating environment 2410. Such software includes an operating system 2428. Operating system 2428, which can be stored on disk storage 2424, acts to control and allocate resources of the computer 2412. System applications 2430 take advantage of the management of resources by operating system 2428 through program modules 2432 and program data 2434 stored either in system memory 2416 or on disk storage 2424. It is to be appreciated that one or more embodiments of the subject disclosure can be implemented with various operating systems or combinations of operating systems.

A user enters commands or information into the computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2414 through the system bus 2418 via interface port(s) 2438. Interface port(s) 2438 include, for example, a serial port, a parallel port, a game port, and a universal serial bus (USB). Output device(s) 2440 use some of the same type of ports as input device(s) 2436. Thus, for example, a USB port may be used to provide input to computer 2412, and to output information from computer 2412 to an output device 2440. Output adapters 2442 are provided to illustrate that there are some output devices 2440 like monitors, speakers, and printers, among other output devices 2440, which require special adapters. The output adapters 2442 include, by way of illustration and not limitation, video and sound cards that provide a means of connection between the output device 2440 and the system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. The remote computer(s) 2444 can be a personal computer, a server, a router, a network PC, a workstation, a microprocessor based appliance, a peer device or other common network node and the like, and typically includes many or all of the elements described relative to computer 2412. For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 2448 can also encompass near field communication (NFC) or Bluetooth communication.

Communication connection(s) 2450 refers to the hardware/software employed to connect the network interface 2448 to the system bus 2418. While communication connection 2450 is shown for illustrative clarity inside computer 2412, it can also be external to computer 2412. The hardware/software necessary for connection to the network interface 2448 includes, for exemplary purposes only, internal and external technologies such as, modems including regular telephone grade modems, cable modems and DSL modems, ISDN adapters, and Ethernet cards.

FIG. 25 is a schematic block diagram of a sample computing environment 2500 with which the disclosed subject matter can interact. The sample computing environment 2500 includes one or more client(s) 2502. The client(s) 2502 can be hardware and/or software (e.g., threads, processes, computing devices). The sample computing environment 2500 also includes one or more server(s) 2504. The server(s) 2504 can also be hardware and/or software (e.g., threads, processes, computing devices). The servers 2504 can house threads to perform transformations by employing one or more embodiments as described herein, for example. One possible communication between a client 2502 and servers 2504 can be in the form of a data packet adapted to be transmitted between two or more computer processes. The sample computing environment 2500 includes a communication framework 2506 that can be employed to facilitate communications between the client(s) 2502 and the server(s) 2504. The client(s) 2502 are operably connected to one or more client data store(s) 2508 that can be employed to store information local to the client(s) 2502. Similarly, the server(s) 2504 are operably connected to one or more server data store(s) 2510 that can be employed to store information local to the servers 2504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for searching industrial data, comprising:
    a memory that stores executable components;
    a processor, operatively coupled to the memory, that executes the executable components, the executable components comprising:
    a discovery component configured to discover available data items distributed across data sources of multiple industrial sites, wherein the data sources comprise at least a first data source corresponding to a first data platform and a second data source corresponding to a second data platform;
    an indexing component configured to generate a searchable federated data model that records respective locations of the available data items based on information about the available data items generated by the discovery component;
    a device interface component configured to track location information for a remote client device associated with a user identity; and
    a caching component configured to determine, based on the location information, a trajectory of the remote client device, infer, based on the trajectory, an industrial site to which the remote client device is in transit, determine that the industrial site has limited connectivity to an external network, and send a portion of the searchable federated data model corresponding to the industrial site to the remote client device via one or more wireless networks to be cached on the remote client device prior to arrival at the industrial site and based on the limited connectivity to the external network, wherein the portion of the searchable federated data model is searchable on the remote client device.

2. The system of claim 1, wherein the device interface component is further configured to receive a search query from the remote client device, and
    the system further comprises a search component configured to perform a search of the searchable federated data model for a data item specified by the search query and to generate a set of search results that identify locations of the data item, wherein the set of search results comprises at least a first subset of results corresponding to the first data platform and a second subset of results corresponding to the second data platform.

3. The system of claim 1, wherein the caching component is further configured to select the portion of the searchable federated data model based at least in part on a history of searches submitted to the device interface component in association with the user identity.

4. The system of claim 1, wherein the caching component is further configured to select the portion of the searchable federated data model based at least in part on a defined user role associated with the user identity.

5. The system of claim 1, wherein the caching component is further configured to identify one or more automation systems defined as being associated with the user identity, and to select, as the portion of the searchable federated data model, a subset of the searchable federated data model corresponding to the one or more automation systems.

6. The system of claim 1, wherein the portion of the searchable federated data model is a first portion, and wherein the caching component is further configured to
    identify one or more plant facilities defined as being associated with the user identity, select, as another a second portion of the searchable federated data model, a subset of the searchable federated data model corresponding to the one or more plant facilities, and
    send the other second portion of the searchable federated data model to the remote client device to be cached on the remote client device.

7. The system of claim 1, wherein the portion of the searchable federated data model is a first portion, and wherein the caching component is further configured to select a second portion of the searchable federated data model based at least in part on a history of locations of the remote client device relative to one or more industrial automation systems, and to send the second portion of the searchable federated data model to the remote client device to be cached on the remote client device.

8. The system of claim 1, wherein the caching component is further configured to receive a federated data sub-model from the remote client device, and to integrate the federated data sub-model with the searchable federated data model, wherein the federated data sub-model comprises an index of other available data items stored on one or more industrial devices.

9. The system of claim 1, wherein at least one of the first data source or the second data source comprises an industrial controller, and the discovery component is configured to discover, as one of the available data items, a reference to a data tag in a control program executing on the industrial controller.

10. The system of claim 1, wherein at least one of the first data source or the second data source comprises at least one of a human-machine interface terminal, a data historian device, a device documentation data store, or an inventory data store.

11. A method for providing offline access to an industrial data search system, comprising:
receiving, by a system comprising a processor, information about available data items located on multiple data sources within industrial facilities, wherein the multiple data sources comprise at least a first data source corresponding to a first data platform and a second data source corresponding to a second data platform;
generating, by the system, a federated data model that indexes respective locations of the available data items;
tracking, by the system, a location of a remote client device associated with a user identity to yield location data;
inferring, by the system, a trajectory of the remote client device based on the location data;
inferring, by the system based on the trajectory, an industrial facility to which the remote client device is in transit;
determining, by the system, that communication access between the industrial facility and an external communication network is unavailable; and
sending, by the system via one or more wireless networks, a subset of the federated data model corresponding to the industrial facility to be cached on the remote client device prior to arrival at the industrial facility, wherein the subset of the federated data model is searchable on the remote client device.

12. The method of claim 11, further comprising:
receiving, by the system, a search query from the remote client device;
performing, by the system, a search of the federated data model for a data item specified by the search query; and
generating, by the system, a set of search results that identify locations of the data item, wherein the set of search results comprises at least a first subset of results corresponding to the first data platform and a second subset of results corresponding to the second data platform.

13. The method of claim 12, wherein the selecting comprises selecting the subset of the federated data model based at least in part on a history of queries submitted to the system in association with the user identity.

14. The method of claim 11, wherein the selecting comprises selecting the subset of the federated data model based at least in part on a user role defined for the user identity.

15. The method of claim 11, wherein the subset of the federated data model is a first subset of the federated data model, and wherein the method further comprising:
determining, by the system, one or more automation systems defined as having an association with the user identity; and
sending, by the system, a second subset of the federated data model corresponding to the one or more automation systems to be cached on the remote client device based on determining that one or more automation systems are defined as having an association with the user identity.

16. The method of claim 11, further comprising:
determining, by the system, one or more plant facilities defined as having an association with the user identity; and
in response to the determining the one or more plant facilities, sending, by the system, another subset of the federated data model corresponding to the one or more plant facilities to be cached on the remote client device.

17. The method of claim 11, wherein the selecting comprises selecting the subset of the federated data model based at least in part on a history of locations of the remote client device relative to one or more industrial automation systems.

18. The method of claim 11, further comprising:
receiving, by the system, a federated data sub-model from the remote client device, wherein the federated data sub-model comprises an index of other available data items stored on one or more industrial devices; and
integrating, by the system, the federated data sub-model with the federated data model.

19. A non-transitory computer-readable medium having stored thereon instructions that, in response to execution, cause a system comprising a processor to perform operations, the operations comprising:
receiving information about available data items located on data sources at multiple industrial sites, wherein the data sources comprise at least a first data source corresponding to a first data platform and a second data source corresponding to a second data platform;
generating a federated data model that indexes respective locations of the available data items;
monitoring a location of a remote client device associated with a user identity to yield location data;
determining a trajectory of the remote client device based on the location data;
identifying, based on analysis of the trajectory, an industrial site to which the remote client device is in transit;
determining communication connectivity between the federated data model and the remote client device is unavailable at the industrial site; and
sending, via one or more wireless networks, a portion of the federated data model corresponding to the industrial site to the remote client device prior to arrival at the industrial site, the portion of the federated data model is to be cached on the remote client device, wherein the portion of the federated data model is searchable on the remote client device.

20. The non-transitory computer-readable medium of claim 19, the operations further comprising:

receiving a federated data sub-model from the remote client device, wherein the federated data sub-model comprises an index of other available data items stored on one or more industrial devices; and integrating the federated data sub-model with the federated data model.

\* \* \* \* \*